US012082025B2

(12) United States Patent
Da Silva et al.

(10) Patent No.: US 12,082,025 B2
(45) Date of Patent: Sep. 3, 2024

(54) EARLY MEASUREMENT REPORTING WITH RRC RESUME COMPLETE LIKE MESSAGE

(71) Applicant: Telefonaktiebolaget LM Ericsson (publ), Stockholm (SE)

(72) Inventors: Icaro Leonardo Da Silva, Solna (SE); Antonino Orsino, Kirkkonummi (FI); Oumer Teyeb, Solna (SE); Patrik Rugeland, Stockholm (SE); Jens Bergqvist, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 311 days.

(21) Appl. No.: 17/311,168

(22) PCT Filed: Nov. 7, 2019

(86) PCT No.: PCT/SE2019/051122
§ 371 (c)(1),
(2) Date: Jun. 4, 2021

(87) PCT Pub. No.: WO2020/167182
PCT Pub. Date: Aug. 20, 2020

(65) Prior Publication Data
US 2021/0392537 A1    Dec. 16, 2021

Related U.S. Application Data

(60) Provisional application No. 62/804,603, filed on Feb. 12, 2019.

(51) Int. Cl.
*H04W 24/10*    (2009.01)
*H04W 76/25*    (2018.01)
(52) U.S. Cl.
CPC ........... *H04W 24/10* (2013.01); *H04W 76/25* (2018.02)

(58) Field of Classification Search
CPC .............................. H04W 24/10; H04W 76/25
See application file for complete search history.

(56) References Cited

U.S. PATENT DOCUMENTS

2018/0368018 A1\* 12/2018 Kim .................. H04L 69/08
2019/0014492 A1\* 1/2019 Kim .................. H04W 76/27
2022/0116809 A1\* 4/2022 Cheng .................. H04W 76/30

FOREIGN PATENT DOCUMENTS

WO    2018236172 A1    12/2018

OTHER PUBLICATIONS

3GPP, "3GPP TS 23.401 V16.1.0", 3rd Generation Partnership Project; Technical Specification Group Services and System Aspects; General Packet Radio Service (GPRS) enhancements for Evolved Universal Terrestrial Radio Access Network (E-UTRAN) access (Release 16), Dec. 2018, 1-441.

(Continued)

*Primary Examiner* — Elton Williams
(74) *Attorney, Agent, or Firm* — Murphy, Bilak & Homiller, PLLC

(57) ABSTRACT

Systems and methods for early measurement reporting with a Radio Resource Control (RRC) resume complete like message are disclosed. Embodiments of a method performed by a wireless device and corresponding embodiments of a wireless device are disclosed. In some embodiments, a method performed by a wireless device comprises receiving, from a network node, an indication with a first message to resume a connection with a target cell. The indication is an indication that the wireless device is to include measurements performed by the wireless device while in a dormant state with a second message that indicates that resuming of the connection with the target cell is complete. The method further comprises transmitting, to the network node, the (Continued)

measurements performed by the wireless device while in the dormant state with the second message.

23 Claims, 18 Drawing Sheets

(56) References Cited

OTHER PUBLICATIONS

3GPP, "3GPP TS 36.321 V15.4.0", 3rd Generation Partnership Project; Technical Specification Group Radio Access Network; Evolved Universal Terrestrial Radio Access (E-UTRA); Medium Access Control (MAC) protocol specification (Release 15), Dec. 2018, 1-131.

3GPP, "3GPP TS 36.331 V15.3.0", 3rd Generation Partnership Project; Technical Specification Group Radio Access Network; Evolved Universal Terrestrial Radio Access (E-UTRA); Radio Resource Control (RRC); Protocol specification (Release 15), Sep. 2018, 1-918.

3GPP, "3rd Generation Partnership Project; Technical Specification Group Radio Access Network; Evolved Universal Terrestrial Radio Access (E-UTRA); Requirements for support of radio resource management (Release 16)", TS 36.133 V16.0.0, Dec. 2018, 1-3563.

3GPP, "3rd Generation Partnership Project; Technical Specification Group Radio Access Network; NR; Radio Resource Control (RRC) protocol specification (Release 15)", TS 38.331 V15.4.0, Dec. 2018, 1-474.

Huawei, et al., "Discussion on Aperiodic idle mode measurements", 3GPP TSG-RAN WG2 Meeting #103, R2-1812092, (resubmission of R2-1807482), Gothenburg, Sweden, Aug. 20-24, 2018, 1-2.

Rapporteur (Ericsson), "Running CR for 38.331 for CA&DC enh", 3GPP TSG-RAN WG2 Meeting #107, R2-1911763, (revision of R2-1910238), Prague, Czech Republic, Aug. 26-30, 2019, 1-45.

Unknown, Author, "Fast SCell Configuration through Quick SCell Measurement Reporting", 3GPP TSG-RAN2 Meeting #101, R2-1802073, Athens, Greece, Feb. 26-Mar. 2, 2018, pp. 1-8.

* cited by examiner

Note: The action of moving to Dormant is called "Hybernation"

3GPP Scenarios, LTE and NR Interworking Options

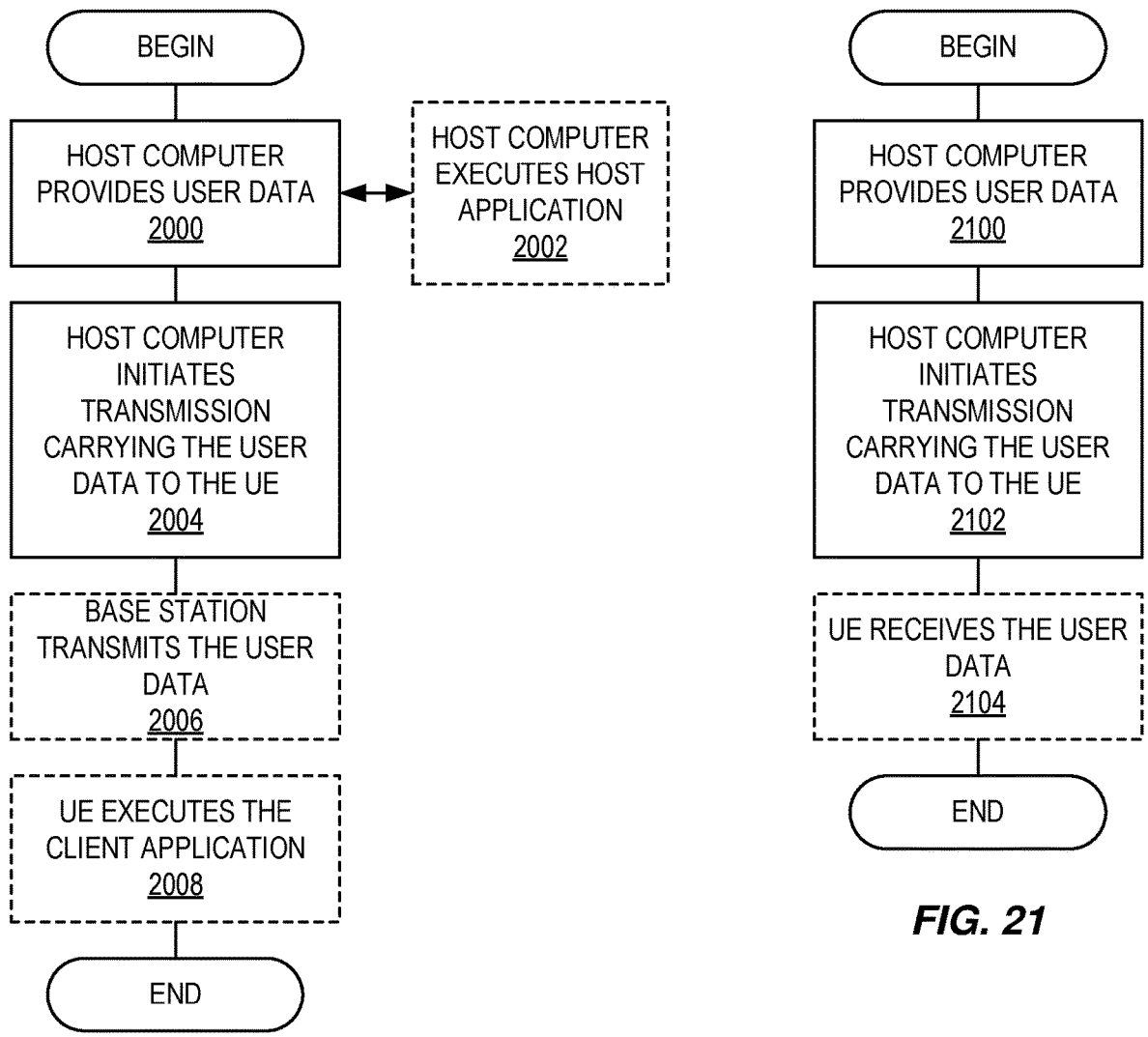

EARLY MEASUREMENT REPORTING WITH RRC RESUME COMPLETE LIKE MESSAGE

RELATED APPLICATIONS

This application claims the benefit of provisional patent application Ser. No. 62/804,603, filed Feb. 12, 2019, the disclosure of which is hereby incorporated herein by reference in its entirety.

TECHNICAL FIELD

The present disclosure relates to measurement reporting in a cellular communications system.

BACKGROUND

I Carrier Aggregation (CA) and Dual Connectivity (DC) in Long Term Evolution (LTE)

In Release 10, CA was introduced in LTE to enable the User Equipment (UE) to transmit and/or receive information via multiple cells (so called Secondary Cell(s) (SCell(s))) from multiple carrier frequencies, to benefit of the existence of non-contiguous and contiguous carriers. In CA terminology, the Primary Cell (PCell) is the cell towards which the UE establishes the Radio Resource Control (RRC) connection or performs handover. In CA, cells are aggregated on the Medium Access Control (MAC) level. MAC gets grants for a certain cell and multiplexes data from different bearers to one transport block being sent on that cell. Also, MAC controls how that process is done. This is illustrated in FIG. 1.

SCells can be "added" (i.e., "configured") for the UE using RRC signaling (e.g., RRCConnectionReconfiguration), which takes in the order of hundreds of milliseconds. A cell that is configured for the UE becomes a "serving cell" for this UE. An SCell may also be associated with an SCell state. When configured/added via RRC, an SCell starts in deactivated state. In LTE Release 15, the enhanced or evolved Node B (eNB) can indicate to activate-upon-configuration, or change the state, at least in RRCReconfiguration, as shown below (from Third Generation Partnership Project (3GPP) Technical Specification (TS) 36.331 V15.3.0):

```
1> for each SCell configured for the UE other than the PSCell:
    2> if the received RRCConnectionReconfiguration message includes sCellState for the SCell and indicates
        activated:
        3> configure lower layers to consider the SCell to be in activated state;
    2> else if the received RRCConnectionReconfiguration message includes sCellState for the SCell and
        indicates dormant:
        3> configure lower layers to consider the SCell to be in dormant state;
    2> else:
        3> configure lower layers to consider the SCell to be in deactivated state;
```

In LTE Release 15, a new intermediate state between the deactivated and active state has been introduced for enhanced uplink operation. A MAC Control Element (CE) can be used to change the SCell state between the three states, as shown in FIG. 2. There are also timers in MAC to move a cell between deactivated/activated/dormant. These timers are:

sCellHibernationTimer, which moves the SCell from activated state to dormant state, sCellDeactivationTimer, which moves the SCell from activated state to deactivated state, and dormantSCellDeactivationTimer, which moves the SCell from dormant state to deactivated state.

The MAC level SCell activation takes in the order of 20-30 milliseconds (ms).

Once the network understands the need to configure and/or activate CA, the question is which cells to initially configure and/or activate, if they are configured, and/or whether a cell/carrier is good enough in terms of radio quality/coverage (e.g., Reference Signal Received Power (RSRP) and Reference Signal Received Quality (RSRQ)). To understand the conditions on an SCell(s) or a potential SCell(s) in a given available carrier, the network may configure the UE to perform Radio Resource Management (RRM) measurements.

Typically, the network may be assisted by RRM measurements to be reported by a UE. The network may configure the UE with measurement identities (IDs) associated to reportConfig with event A1 (serving cell becomes better than threshold) in case this is a configured SCell, or A4 (neighbor cell becomes better than threshold) for carriers without a configured SCell. The measurement objects are associated to the carrier the network wants reports on. If the network is aware of the exact cells it wants the UE to measure, a so-called white cell list can be configured in the measurement object so that the UE is only required to measure these cells in that carrier.

FIG. 3 illustrates a process in which the network decides to setup CA or DC for a UE. The network then configures the UE to perform measurements, and the UE sends the appropriate measurement reports to the network. Based on the received measurement reports, the network makes a decision on SCell addition or SCell activation and then configures the UE to add the selected SCell(s).

With the introduction of DC in Release 12, it was possible to add what is called Secondary Cell Group (SGC) configuration to the UE. The main benefit would be that the UE could in principle add a cell from another eNB. Protocol-wise, that would require different MAC entities, one for each cell group. The UE will have two cell groups, one associated to the PCell (master node) and another associated to a Primary Secondary Cell (PSCell) (of the secondary eNB), where each group may possibly have their own associated SCells.

When it comes to adding SCells, when the UE is in single connectivity, the RRCConnectionReconfiguration message may carry a cell index (so MAC identifiers are optimized, i.e., shorter), cell identifier and carrier frequency, common parameters, and state information, introduced in Release 15 (activated or dormant).

The SCellToAddModList included in the RRCConnectionReconfiguration is illustrated and described below.

```
SCellToAddModList-r10 ::=                   SEQUENCE (SIZE (1..maxSCell-r10))
OF SCellToAddMod-r10
SCellToAddMod-r10 ::=                       SEQUENCE {
    sCellIndex-r10                              SCellIndex-r10,
    cellIdentification-r10                      SEQUENCE {
        physCellId-r10                              PhysCellId,
        dl-CarrierFreq-r10                          ARFCN-ValueEUTRA
    }                                                   OPTIONAL,-- Cond
SCellAdd
    radioResourceConfigCommonSCell-r10
    RadioResourceConfigCommonSCell-r10 OPTIONAL,                -- Cond
SCellAdd
    radioResourceConfigDedicatedSCell-r10
    RadioResourceConfigDedicatedSCell-r10 OPTIONAL,             -- Cond
SCellAdd2
    ...,
    [[ dl-CarrierFreq-v1090                     ARFCN-ValueEUTRA-v9e0
        OPTIONAL        -- Cond EARFCN-max
    ]],
    [[ antennaInfoDedicatedSCell-v10i0                      AntennaInfoDedicated-
v10i0 OPTIONAL          -- Need ON
    ]],
    [[ srs-SwitchFromServCellIndex-r14          INTEGER (0.. 31)
OPTIONAL            -- Need ON
    ]],
    [[ sCellState-r15                           ENUMERATED {activated,
dormant}            OPTIONAL    -- Need ON
    ]]
}
```

| RRCConnectionReconfiguration field descriptions |
| --- |
| sCellConfigCommon
Indicates the common configuration for the SCell group.
sCellGroupIndex
Indicates the identity of SCell groups for which a common configuration is provided.
sCellIndex
In case of DC, the SCellIndex is unique within the scope of the UE i.e. an SCG cell can not use the same value as used for an MCG cell. For pSCellToAddMod, if sCellIndex-r13 is present the UE shall ignore sCellIndex-r12. sCellIndex-r13 in sCellToAddModListExt-r13 shall not have same values as sCellIndex-r10 in sCellToAddModList-r10.
sCellGroupToAddModList, sCellGroupToAddModListSCG
Indicates the SCell group to be added or modified. E-UTRAN only configures at most 4 SCell groups per UE over all cell groups.
sCellGroupToReleaseList
Indicates the SCell group to be released.
sCellState
A one-shot field that indicates whether the SCell shall be considered to be in activated or dormant state upon SCell configuration.
sCellToAddModList, sCellToAddModListExt
Indicates the SCell to be added or modified. Field sCellToAddModList is used to add the first 4 SCells for a UE with sCellIndex-r10 while sCellToAddModListExt is used to add the rest. If E-UTRAN includes sCellToAddModListExt-v1430 it includes the same number of entries, and listed in the same order, as in sCellToAddModListExt-r13. If E-UTRAN includes sCellToAddModList-v10l0 it includes the same number of entries, and listed in the same order, as in sCellToAddModList-r10. If E-UTRAN includes sCellToAddModListExt-v1370 it includes the same number of entries, and listed in the same order, as in sCellToAddModListExt-r13. If E-UTRAN includes sCellToAddModListExt-v13c0 it includes the same number of entries, and listed in the same order, as in sCellToAddModListExt-r13.
sCellToAddModListSCG, sCellToAddModListSCG-Ext
Indicates the SCG cell to be added or modified. The field is used for SCG cells other than the PSCell (which is added/modified by field pSCellToAddMod). Field sCellToAddModListSCG is used to add the first 4 SCells for a UE with sCellIndex-r10 while sCellToAddModListSCG-Ext is used to add the rest. If E-UTRAN includes sCellToAddModListSCG-v10l0 it includes the same number of entries, and listed in the same order, as in sCellToAddModListSCG-r12. If E-UTRAN includes sCellToAddModListSCG-Ext-v1370 it includes the same number of entries, and listed in the same order, as in sCellToAddModListSCG-Ext-r13. If E-UTRAN includes sCellToAddModListSCG-Ext-v13c0 it includes the same number of entries, and listed in the same order, as in sCellToAddModListSCG-Ext-r13. |

| RRCConnectionReconfiguration field descriptions |
| --- |
| sCellToReleaseListSCG, sCellToReleaseListSCG-Ext<br>Indicates the SCG cell to be released. The field is also used to release the PSCell<br>e.g. upon change of PSCell, upon system information change for the PSCell. |

The procedure to add SCells to the Master Cell Group (MCG) in LTE (or to modify) is described as follows (as in 3GPP TS 36.331 V15.3.0):

```
5.3.5.3  Reception of an RRCConnectionReconfiguration not including the
mobilityControlInfo by the UE
If the RRCConnectionReconfiguration message does not include the mobilityControlInfo and the
UE is able to comply with the configuration included in this message, the UE shall:
...
    1> if the received RRCConnectionReconfiguration includes the sCellToAddModList:
        2> perform SCell addition or modification as specified in 5.3.10.3b;
...
5.3.10.3b  SCell addition/ modification
The UE shall:
    1> for each sCellIndex value included either in the sCellToAddModList or in the
        sCellToAddModListSCG that is not part of the current UE configuration (SCell addition):
        2> add the SCell, corresponding to the cellIdentification, in accordance with the
            radioResourceConfigCommonSCell and radioResourceConfigDedicatedSCell, both
            included either in the sCellToAddModList or in the sCellToAddModListSCG;
        2> if sCellState is configured for the SCell and indicates activated:
            3> configure lower layers to consider the SCell to be in activated state;
        2> else if sCellState is configured for the SCell and indicates dormant:
            3> configure lower layers to consider the SCell to be in dormant state;
        2> else:
            3> configure lower layers to consider the SCell to be in deactivated state;
        2> for each measId included in the measIdList within VarMeasConfig:
            3> if SCells are not applicable for the associated measurement; and
            3> if the concerned SCell is included in cellsTriggeredList defined within the
                VarMeasReportList for this measId:
                4> remove the concerned SCell from cellsTriggeredList defined within the
                    VarMeasReportList for this measId;
    1> for each sCellIndex value included either in the sCellToAddModList or in the
        sCellToAddModListSCG that is part of the current UE configuration (SCell modification):
        2> modify the SCell configuration in accordance with the
            radioResourceConfigDedicatedSCell, included either in the sCellToAddModList or in
            the sCellToAddModListSCG;
```

II Inter Radio Access Technology (RAT) and Inter Fifth Generation (5G) Core (5GC) interworking in LTE and New Radio (NR)

5G in 3GPP introduces both a new core network, which is referred to as the 5GC, and a new Radio Access Network (RAN), which is referred to as NR. The 5GC will, however, also support RATs other than NR. It has been agreed that LTE (or Evolved Universal Terrestrial Radio Access (E-UTRA)) should also be connected to 5GC. LTE base stations (i.e., eNBs) that are connected to 5GC are called ng-eNBs and are part of Next Generation RAN (NG-RAN), which also includes NR base stations called gNBs. FIG. 4 shows how the base stations are connected to each other and the nodes in 5GC. In particular, FIG. 4 is the 5G System (5GS) architecture containing 5GC and NG-RAN.

There are different ways to deploy a 5G network with or without interworking with LTE (also referred to as E-UTRA) and Evolved Packet Core (EPC), as depicted in FIG. 5. In principle, NR and LTE can be deployed without any interworking, denoted by NR Stand-Alone (SA) operation, that is the gNB in NR can be connected to 5GC and the eNB can be connected to EPC with no interconnection between the two (Option 1 and Option 2 in FIG. 5). On the other hand, the first supported version of NR is the so-called Evolved Universal Terrestrial Radio Access Network (E-UTRAN) NR DC (EN-DC), illustrated by Option 3 in FIG. 5. In such a deployment, DC between NR and LTE is applied with LTE as the master and NR as the secondary node. The RAN node (gNB) supporting NR may not have a control plane connection to the core network (EPC); instead, the gNB relies on the LTE as master node (Master eNB (MeNB)). This is also called "Non-standalone NR". Notice that in this case the functionality of an NR cell is limited and would be used for connected mode UEs as a booster and/or diversity leg, but an RRC_IDLE UE cannot camp on these NR cells.

With introduction of 5GC, other options may also be valid. As mentioned above, Option 2 in FIG. 5 supports SA NR deployment where the gNB is connected to 5GC. Similarly, LTE can also be connected to 5GC using Option 5 (also known as enhanced LTE (eLTE), E-UTRA/5GC, or LTE/5GC and the node can be referred to as an ng-eNB). In these cases, both NR and LTE are seen as part of the NG-RAN (and both the ng-eNB and the gNB can be referred to as NG-RAN nodes). It is worth noting that Option 4 and Option 7 are other variants of DC between LTE and NR which will be standardized as part of NG-RAN connected to 5GC, denoted by Multi-Radio DC (MR-DC). Under the MR-DC umbrella, we have:

EN-DC (Option 3): LTE is the master node and NR is the secondary node (EPC Core Network (CN) employed)

NR E-UTRA (NE)—DC (Option 4): NR is the master node and LTE is the secondary node (5GC employed)

Next Generation EN-DC (NGEN-DC) (Option 7): LTE is the master node and NR is the secondary node (5GC employed)

NR-DC (variant of Option 2): DC where both the master and secondary nodes are NR (5GC employed).

As migration for these options may differ from different operators, it is possible to have deployments with multiple options in parallel in the same network, e.g. there could be an eNB base station supporting Options 3, 5, and 7 in the same network as an NR base station supporting Options 2 and 4. In combination with DC solutions between LTE and NR, it is also possible to support CA in each cell group (i.e., MCG and SCG) and DC between nodes on the same RAT (e.g., NR-NR DC). For the LTE cells, a consequence of these different deployments is the co-existence of LTE cells associated to eNBs connected to EPC, 5GC, or both EPC/5GC.

III Suspend/Resume in LTE and Relation to CA/SCell and SCG Additions

A very typical scenario or use case is a UE with some burst traffic that comes and goes, e.g. some video packets and idle periods of transmission/reception, then comes live again. To save UE power, the network transitions the UE from connected to idle during these periods. Then, the UE comes back again (either via paging or UE request to get connected) and accesses the network.

In LTE Release 13, a mechanism was introduced for the UE to be suspended by the network in a suspended state similar to RRC_IDLE but with the difference that the UE stores the Access Stratum (AS) context or RRC context. This makes it possible to reduce the signaling when the UE is becoming active again by resuming the RRC connection instead of establishing the RRC connection from scratch. Reducing the signaling could have several benefits such as:
  reduced latency, e.g., for smart phones accessing the Internet, and
  reduced signaling, which leads to reduced battery consumption, for machine type devices sending very little data.

The Release 13 solution is based on the UE sending a RRCConnectionResumeRequest message to the network and, in response, the UE may receive an RRCConnectionResume from the network. The RRCConnectionResume is not encrypted but integrity protected.

The resume procedure in LTE can be found in the RRC specifications (3GPP TS 36.331). As the UE performing resume is in RRC_IDLE (with suspended AS context), a transition from RRC_IDLE to RRC_CONNECTED is triggered. Hence, this is modelled in the specifications in the same subclause that captures the RRC connection establishment (subclause 5.3.3 RRC connection establishment).

There are few things relevant to highlight in the SCG configurations and SCell configurations for MCGs in relation to suspend/resume procedures. Upon suspension, it is defined that the UE stores its used RRC configuration. In other words, if the UE is operating in any DC mode (and has an SCG configuration) or has just configured SCells in the MCG, the UE stores all these configurations. However, upon resume, at least until Release 15, it is defined that the UE shall release the SCG configurations and SCell configurations, as shown below:

---

5.3.3.2 Initiation
The UE initiates the procedure when upper layers request establishment or resume of an RRC connection while the UE is in RRC_IDLE or when upper layers request resume of an RRC connection or RRC layer requests resume of an RRC connection for, e.g. RNAU or reception of RAN paging while the UE is in RRC_INACTIVE.
...
Except for NB-IoT, upon initiating the procedure, if connected to EPC or 5GC, the UE shall:
    1> if the UE is resuming an RRC connection from a suspended RRC connection or from RRC_INACTIVE:
        2> if the UE is resuming an RRC connection from a suspended RRC connection:
            3> if the UE was configured with EN-DC:
                4> perform EN-DC release, as specified in TS 38.331 [82], clause 5.3.5.10;
        2> release the MCG SCell(s), if configured, in accordance with 5.3.10.3a;
    ...
        2> release the entire SCG configuration, if configured, except for the DRB configuration (as configured by drb-ToAddModListSCG);

---

Hence, when the UE comes from RRC_IDLE with the context, if the network wants to add SCell(s) to the MCG or add an SCG, the network needs to do that from scratch, even if the UE is suspending and resuming in the same cell/area where all the previous PCell and SCell configurations are still valid from a radio conditions perspective.

As the use case of UEs with burst traffic constantly being suspended and resumed in the same cell is quite typical, 3GPP has standardized a solution in LTE to enable the UE to assist the network with measurements performed while the UE is in RRC_IDLE so that the network could speed up the setup of CA or DC. That solution is described below.

IV Existing Solution for Early Measurements Upon Idle to Connected Transition in LTE (Release 15)

In LTE Release 15, it is possible to configure the UE to report so-called early measurements upon the transition from idle to connected state. These measurements are measurements that the UE can perform in idle state, and according to a configuration provided by the source cell with the intention to receive these measurements immediately after the UE is connected and quickly sets up CA and/or other forms of DC (e.g., EN-DC, MR-DC, etc.) without the need to first provide a measurement configuration (measConfig) in RRC_CONNECTED, as shown in previous sections, and waits for hundreds of milliseconds until first samples are collected, monitored, and then the first reports are triggered and transmitted to the network.

A Measurement Configuration for Early Measurements Upon Resume in LTE

A first aspect of the existing solution, as standardized in E-UTRA 3GPP TS 36.331, is described in Section 5.6.20 Idle Mode Measurements. The UE can receive these idle mode measurement configurations in the system information (SIB5) in the field MeasIdleConfigSIB-r15, indicating up to eight cells or ranges of cell IDs on which to perform measurements. In addition, the UE can be configured upon the transition from RRC_CONNECTED to RRC_IDLE with a dedicated measurement configuration in the RRCConnectionRelease message with the measIdleDedicated-r15 which overrides the broadcasted configurations in SIB5. The broadcasted and dedicated signaling is shown below:

| RRCConnectionRelease message |
|---|
| ```
-- ASN1START
RRCConnectionRelease ::=            SEQUENCE {
    rrc-TransactionIdentifier           RRC-TransactionIdentifier,
    criticalExtensions                  CHOICE {
        c1                                  CHOICE {
            rrcConnectionRelease-r8             RRCConnectionRelease-r8-IEs,
            spare3 NULL, spare2 NULL, spare1 NULL
        },
        criticalExtensionsFuture            SEQUENCE { }
    }
}
-- other info has been omitted
RRCConnectionRelease-v1530-IEs ::= SEQUENCE {
    drb-ContinueROHC-r15                ENUMERATED {true}       OPTIONAL,
    -- Cond UP-EDT
    nextHopChainingCount-r15            NextHopChainingCount    OPTIONAL,           -- Cond UP-EDT
    measIdleConfig-r15                  MeasIdleConfigDedicated-r15     OPTIONAL,           -- Need ON
    rrc-InactiveConfig-r15              RRC-InactiveConfig-r15          OPTIONAL,           -- Need OR
    cn-Type-r15                         ENUMERATED {epc,fivegc}         OPTIONAL,           -- Need OR
    nonCriticalExtension                SEQUENCE { }                    OPTIONAL
}
-- ASN1STOP
``` |

| MeasIdleConfig information element |
|---|
| ```
-- ASN1START
MeasIdleConfigSIB-r15 ::= SEQUENCE {
    measIdleCarrierListEUTRA-r15        EUTRA-CarrierList-r15,
    ...
}
MeasIdleConfigDedicated-r15 ::=         SEQUENCE {
    measIdleCarrierListEUTRA-r15        EUTRA-CarrierList-r15       OPTIONAL,       -- Need OR
    measIdleDuration-r15 ENUMERATED {sec10, sec30, sec60, sec120,
                                     sec180, sec240, sec300, spare},
    ...
}
EUTRA-CarrierList-r15 ::= SEQUENCE (SIZE (1..maxFreqIdle-r15)) OF MeasIdleCarrierEUTRA-r15
MeasIdleCarrierEUTRA-r15::=             SEQUENCE {
    carrierFreq-r15                     ARFCN-ValueEUTRA-r9,
    allowedMeasBandwidth-r15            AllowedMeasBandwidth,
    validityArea-r15                    CellList-r15   OPTIONAL,      -- Need OR
    measCellList-r15                    CellList-r15   OPTIONAL,      -- Need OR
    reportQuantities                    ENUMERATED {rsrp, rsrq, both},
    qualityThreshold-r15                SEQUENCE {
        idleRSRP-Threshold-r15              RSRP-Range       OPTIONAL,       -- Need OR
        idleRSRQ-Threshold-r15              RSRQ-Range-r13   OPTIONAL        -- Need OR
    }                                                   OPTIONAL, -- Need OR
    ...
}
CellList-r15 ::= SEQUENCE (SIZE (1.. maxCellMeasIdle-r15)) OF PhysCellIdRange
-- ASN1STOP
``` |

| MeasIdleConfig field descriptions |
|---|
| allowedMeasBandwidth<br>If absent, the value corresponding to the downlink bandwidth indicated by the dl-Bandwidth included in MasterInformation Block of serving cell applies.<br>carrierFreq<br>Indicates the E-UTRA carrier frequency to be used for measurements during IDLE mode.<br>measIdleCarrierListEUTRA<br>Indicates the E-UTRA carriers to be measured during IDLE mode.<br>measIdleDuration<br>Indicates the duration for performing measurements during IDLE mode for measurements assigned via RRCConnectionRelease. Value sec10 | correspond to 10 seconds, value sec30 to 30 seconds and so on.
qualityThreshold
Indicates the quality thresholds for reporting the measured cells for IDLE
mode measurements.
reportQuantities
Indicates which measurment quantities UE is requested to report in the IDLE
mode measurement report.
measCellList
Indicates the list of cells which the UE is requested to measure and report for
IDLE mode measurements.
validityArea
Indicates the list of cells within which UE is requested to do IDLE mode
measurements. If the UE reselects to a cell outside this list, the
measurements are no longer required.

Carrier information and cell list: The UE is provided with a list of carriers and optionally with a list of cells on which the UE shall perform measurements. The fields s-NonIntraSearch in SystemInformationBlockType3 do not affect the UE measurement procedures in IDLE mode.

Timer T331: Upon the reception of that measurement configuration, the UE starts a timer T331 with the value provided in measIdleDuration, which can go from 0 to 300 seconds. The timer stops upon receiving RRCConnectionSetup, RRCConnectionResume which indicates a transition to RRC_CONNECTED. That concept exists to limit the amount of time the UE performs measurements for the purpose of early measurements.

Validity Area: Another concept introduced in the LTE Release 15 solution is a validity area, which comprises a list of Physical Cell Identities (PCIs). The intention is to limit the area where CA or DC may be setup later when the UE resumes/setups the connection, so the early measurements are somewhat useful for that purpose. If validityArea is configured, and the UE reselects to a serving cell whose PCI does not match any entry in validityArea for the corresponding carrier frequency, the timer T331 is stopped. Then, the UE stops to perform IDLE measurements and releases the configuration (i.e., VarMeasIdleConfig). Notice that this does not necessarily imply that the UE releases the idle measurements that were configured in the RRC Release like message (e.g., RRCRelease) and that were performed, i.e. these may still be stored and possibly requested by the network. In addition, the UE may continue with IDLE mode measurements according to the broadcasted SIB5 configuration after the timer T331 has expired or stopped.

Minimum quality threshold: Notice also that only measurements above a certain threshold shall be stored as the cell candidates for CA setup need to be within a minimum acceptable threshold. How the UE performs measurements in IDLE mode is up to UE implementation as long as RAN4 requirements for measurement reporting defined in TS 36.133 are met.

The UE behavior is shown below in more detail as captured in TS 36.331:

5.6.20 Idle Mode Measurements
5.6.20.1 General
This procedure specifies the measurements done by a UE in RRC_IDLE when it has an IDLE
mode measurement configuration and the storage of the available measurements by a UE in both
RRC_IDLE and RRC_CONNECTED.
5.6.20.2 Initiation
While T331 is running, the UE shall:
   1> perform the measurements in accordance with the following:
      2> for each entry in measIdleCarrierListEUTRA within VarMeasIdleConfig:
         3> if UE supports carrier aggregation between serving carrier and the carrier frequency
            and bandwidth indicated by carrierFreq and allowedMeasBandwidth within the
            corresponding entry;
            4> perform measurements in the carrier frequency and bandwidth indicated by
                carrierFreq and allowedMeasBandwidth within the corresponding entry;
            NOTE: The fields s-NonIntraSearch in SystemInformationBlockType3 do not affect
            the UE measurement procedures in IDLE mode. How the UE performs measurements
            in IDLE mode is up to UE implementation as long as the requirements in TS 36.133
            [16] are met for measurement reporting. UE is not required to perform idle
            measurements if SIB2 idle measurement indication is not configured.
            4> if the measCellList is included:
                5> consider PCell and cells identified by each entry within the measCellList to be
                    applicable for idle mode measurement reporting;
            4> else:
                5> consider PCell and up to maxCellMeasIdle strongest identified cells whose
                    RSRP/RSRQ measurement results are above the value(s) provided in
                    qualityThreshold (if any) to be applicable for idle mode measurement
                    reporting;
            4> store measurement results for cells applicable for idle mode measurement
                reporting within the VarMeasIdleReport;
         3> else:
            4> do not consider the carrier frequency to be applicable for idle mode measurement
                reporting;
   1> if validityArea is configured in VarMeasIdleConfig and UE reselects to a serving cell
      whose physical cell identity does not match any entry in validityArea for the corresponding
      carrier frequency:
      2> stop T331;

```
5.6.20.3  T331 expiry or stop
The UE shall:
    1> if T331 expires or is stopped:
        2> release the VarMeasIdleConfig;
NOTE:It is up to UE implementation whether to continue IDLE mode measurements according
to SIB5 configuration after T331 has expired or stopped.
```

B Indication of Available Early Measurements Upon Resume/Setup in LTE

Another aspect of the existing solution occurs when the UE tries to resume or setup a call from RRC_IDLE without context. If the previous step is performed, i.e. if the UE is configured to store idle measurements, the network may request the UE after resume/setup (after security is activated) whether the UE has idle measurements available.

In the case this UE is setting up a connection coming from RRC_IDLE without the AS context, the network is not aware that the UE has available measurements stored. Then, to allow the network to know that and possibly request the UE to report early measurements, the UE may indicate the availability of stored idle measurements in RRCConnectionSetupComplete. As not all cells would support the feature anyway, the UE only includes that availability information if the cell broadcasts in SIB2 the idleModeMeasurements indication. The flag in RRCReconnectionSetupComplete and procedure text are shown below:

```
RRCConnectionSetupComplete-v1530-IEs ::= SEQUENCE {
    logMeasAvailableBT-r15          ENUMERATED {true}
        OPTIONAL,
    logMeasAvailableWLAN-r15        ENUMERATED {true}
        OPTIONAL,
    idleMeasAvailable-r15           ENUMERATED {true}
        OPTIONAL,
    flightPathInfoAvailable-r15     ENUMERATED {true}
        OPTIONAL,
    connectTo5GC-r15                ENUMERATED {true}
        OPTIONAL,
    registeredAMF-r15               RegisteredAMF-r15
        OPTIONAL,
    s-NSSAI-list-r15                SEQUENCE(SIZE (1..maxNrofS-NSSAI-r15)) OF S-NSSAI-r15 OPTIONAL,
    ng-5G-S-TMSI-Bits-r15           CHOICE {
        ng-5G-S-TMSI-r15                NG-5G-S-TMSI-r15,
        ng-5G-S-TMSI-Part2-r15          BIT STRING (SIZE (8))
    }                                   OPTIONAL,
    nonCriticalExtension            RRCConnectionSetupComplete-v1540-IEs  OPTIONAL
}
```

```
5.3.3.4   Reception of the RRCConnectionSetup by the UE
                NOTE 1: Prior to this, lower layer signalling is used to allocate a C-RNTI. For
                further details see TS 36.321 [6];
The UE shall:
    1> if the RRCConnectionSetup is received in response to an RRCConnectionResumeRequest
       from a suspended RRC connection:
        ...
    1> set the content of RRCConnectionSetupComplete message as follows:
        2> if the RRCConnectionSetup is received in response to an
           RRCConnectionResumeRequest:
           ...
        2> if the UE is connected to EPC:
            3> except for NB-IoT:
                ...
                4> if the SIB2 contains idleModeMeasurements, and the UE has IDLE mode
                   measurement information available in VarMeasIdleReport:
                    5> include the idleMeasAvailable;
                4> stop T331 (if running);
                ...
            3> forNB-IoT:
                4> if the UE supports serving cell idle mode measurements reporting and
                   servingCellMeasInfo is present in SystemInformationBlockType2-NB:
                    5> set the measResultServCell to include the measurements of the serving cell;
                NOTE 2: The UE includes the latest results of the serving cell measurements as
                used
                for cell selection/ reselection evaluation, which are performed in accordance with the
                performance requirements as specified in TS 36.133 [16].
            3> include dcn-ID if a DCN-ID value (see TS 23.401 [41]) is received from upper
               layers;
```

In the case this UE is setting up a connection coming from RRC_IDLE but with a stored AS context (i.e., resume from suspended), the network may be aware that the UE may have available idle measurements stored after checking the fetched context from the source node where the UE got suspended. However, it is still not certain that the UE has measurements available since the UE is only required to perform the measurements if the cells are above the configured RSRP/RSRQ thresholds and while it performs cell selection/cell reselection within the configured validity area.

Then, to allow the network to know that and possibly request the UE to report early measurements, the UE may also indicate the availability of stored idle measurements in RRCConnectionResumeComplete. As not all cells would support the feature anyway, the UE only includes that availability information if the cell broadcasts in SIB2 the idleModeMeasurements indication. The flag in RRCReconnectionResumeComplete and procedure text are shown below:

---

5.3.3.4a  Reception of the RRCConnectionResume by the UE
The UE shall:
...
  1> set the content of RRCConnectionResumeComplete message as follows:
    2> except for NB-IoT:
      ...
      3> if the SIB2 contains idleModeMeasurements, and the UE has IDLE mode
        measurement information available in VarMeasIdleReport:
        4> include the idleMeasAvailable;
      3> stop T331 (if running);
    2> for NB-IoT:
      3> if the UE supports serving cell idle mode measurements reporting and
        servingCellMeasInfo is present in SystemInformationBlockType2-NB:
        4> set the measResultServCell to include the measurements of the serving cell;
        NOTE: The UE includes the latest results of the serving cell measurements as used
        for cell selection/ reselection evaluation, which are performed in accordance with the
        performance requirements as specified in TS 36.133 [16].
  1> submit the RRCConnectionResumeComplete message to lower layers for transmission;
  1> the procedure ends.

---

5.3.3.4a  Reception of the RRCConnectionResume by the UE
The UE shall:
...
  1> set the content of RRCConnectionResumeComplete message as follows:
    2> except for NB-IoT:
      ...
      3> if the SIB2 contains idleModeMeasurements, and the UE has IDLE mode
        measurement information available in VarMeasIdleReport:
        4> include the idleMeasAvailable;
      3> stop T331 (if running);
    2> for NB-IoT:
      3> if the UE supports serving cell idle mode measurements reporting and
        servingCellMeasInfo is present in SystemInformationBlockType2-NB:
        4> set the measResultServCell to include the measurements of the serving cell;
        NOTE:  The UE includes the latest results of the serving cell measurements as used
        for cell selection/ reselection evaluation, which are performed in accordance with the
        performance requirements as specified in TS 36.133 [16].
  1> submit the RRCConnectionResumeComplete message to lower layers for transmission;
  1> the procedure ends.

---

C Reporting of Early Measurements Upon Resume/Setup in LTE

Once the UE indicates to the target cell upon resume or setup that idle measurements are available, the network may finally request the UE to report these available measurements by including the field idleModeMeasurementReq in the UEInformationRequest message transmitted to the UE. Then, the UE responds with a UEInformationResponse containing these measurements.

---

5.6.5.3  Reception of the UEInformationRequest message

Upon receiving the UEInformationRequest message, the UE shall, only after successful security activation:
...
1> if the idleModeMeasurementReq is included in the UEInformationRequest and UE has stored VarMeasIdleReport:
    2> set the measResultListIdle in the UEInformationResponse message to the value of
        idleMeasReport in the VarMeasIdleReport;

2> discard the VarMeasIdleReport upon successful delivery of the UEInformationResponse message confirmed by lower layers;
...

---

UEInformationResponse message

```
-- ASN1START
UEInformationResponse-r9 ::=              SEQUENCE {
    rrc-TransactionIdentifier             RRC-TransactionIdentifier,
    criticalExtensions                    CHOICE {
        c1                                CHOICE {
            ueInformationResponse-r9              UEInformationResponse-r9-IEs,
            spare3 NULL, spare2 NULL, spare1 NULL
        },
        criticalExtensionsFuture          SEQUENCE { }
    }
}
UEInformationResponse-v1530-IEs ::= SEQUENCE {
    measResultListIdle-r15                MeasResultListIdle-r15          OPTIONAL,
    flightPathInfoReport-r15              FlightPathInfoReport-r15
    OPTIONAL, nonCriticalExtension                SEQUENCE { }          OPTIONAL
}
```

V Problems with Existing Solutions

There currently exist certain challenge(s). In particular, using existing technology, there is a substantial delay between when a UE enters RRC_CONNECTED and when the network is able to setup CA and/or DC. There is a need for solutions that enable the network to more quickly setup CA and/or DC.

SUMMARY

Systems and methods for early measurement reporting with a Radio Resource Control (RRC) resume complete like message are disclosed. Embodiments of a method performed by a wireless device and corresponding embodiments of a wireless device are disclosed. In some embodiments, a method performed by a wireless device comprises receiving, from a network node, an indication with a first message to resume a connection with a target cell. The indication is an indication that the wireless device is to include measurements performed by the wireless device while in a dormant state with a second message that indicates that resuming of the connection with the target cell is complete. The method further comprises transmitting, to the network node, the measurements performed by the wireless device while in the dormant state with the second message. In this manner, early measurement reporting with the second message that indicates that resuming of the connection with the target cell is complete is provided.

In some embodiments, receiving the indication with the first message comprises receiving the first message, where the first message comprises the indication. Further, in some embodiments, the first message is an RRCResume message.

In some embodiments, transmitting the measurements comprises transmitting the second message, where the second message comprises the measurements. In some embodiments, the second message is an RRCResumeComplete message.

In some embodiments, the first message is an RRCResume message, and the second message is an RRCResumeComplete message.

In some embodiments, receiving the indication with the first message comprises receiving a separate message that is multiplexed with the first message, the separate message comprising the indication. In some embodiments, the separate message is a UEInformationRequest. In some embodiments, the first message is an RRCResume message.

In some embodiments, transmitting the measurements comprises transmitting a separate message that is multiplexed with the second message, where the separate message comprises the measurements. In some embodiments, the separate message is a UEInformationResponse. In some embodiments, the second message is an RRCResumeComplete message.

In some embodiments, the method further comprises, prior to receiving the indication, transmitting a request to resume the connection with the target cell, where the request comprises an indication that the wireless device has measurements performed by the wireless device while in the dormant state.

In some embodiments, the method further comprises, prior to receiving the indication, identifying that the target cell supports reporting of early measurements. In some embodiments, identifying that the target cell supports reporting of early measurements comprises receiving a list of cells when being suspended or released, where each cell in the list of cells supports reporting of early measurements and the target cell is included in the list of cells.

In some embodiments, the method further comprises receiving, from a network node, a configuration of a time value that indicates that the wireless device should not report early measurements that are older than the time value. In some embodiments, receiving the configuration of the time value comprises receiving the configuration of the time value in a release message.

In some embodiments, a wireless device is adapted to receive, from a network node, an indication with a first message to resume a connection with a target cell. The indication is an indication that the wireless device is to include measurements performed by the wireless device while in a dormant state with a second message that indicates that resuming of the connection with the target cell is complete. The wireless device is further adapted to transmit, to the network node, the measurements performed by the wireless device while in the dormant state with the second message.

Embodiments of a method performed by a base station and corresponding embodiments of a base station are also disclosed. In some embodiments, a method performed by a base station comprises transmitting, to a wireless device that is attempting to resume a connection with an associated target cell, an indication with a first message to resume the connection with the target cell. The indication is an indication that the wireless device is to include measurements performed by the wireless device while in a dormant state with a second message that indicates that resuming of the connection with the target cell is complete. The method further comprises receiving, from the wireless device, the measurements performed by the wireless device while in the dormant state with the second message.

In some embodiments, transmitting the indication with the first message comprises transmitting the first message, where the first message comprises the indication. In some embodiments, the first message is an RRCResume message.

In some embodiments, receiving the measurements comprises receiving the second message, where the second message comprises the measurements. In some embodiments, the second message is an RRCResumeComplete message.

In some embodiments, the first message is an RRCResume message, and the second message is an RRCResumeComplete message.

In some embodiments, transmitting the indication with the first message comprises transmitting a separate message that is multiplexed with the first message, the separate message comprising the indication. In some embodiments, the separate message is a UEInformationRequest. In some embodiments, the first message is an RRCResume message.

In some embodiments, receiving the measurements comprises receiving a separate message that is multiplexed with the second message, the separate message comprising the measurements. In some embodiments, the separate message is a UEInformationResponse. In some embodiments, the second message is an RRCResumeComplete message.

In some embodiments, the method further comprises, prior to transmitting the indication, identifying that the wireless device has measurements performed by the wireless device while in the dormant state. In some embodiments, identifying that the wireless device has measurements performed by the wireless device while in the dormant state comprises receiving, from the wireless device, a request to resume the connection with the target cell, the request comprising an indication that the wireless device has measurements performed by the wireless device while in the dormant state. In some other embodiments, identifying that the wireless device has measurements performed by the wireless device while in the dormant state comprises obtaining an Access Stratum (AS) Context of the wireless device and determining that the wireless device has measurements performed by the wireless device while in the dormant state based on the AS Context of the wireless device.

In some embodiments, the method further comprises, prior to transmitting the indication, broadcasting or otherwise transmitting an indication that the target cell supports reporting of early measurements.

In some embodiments, a base station is adapted to transmit, to a wireless device that is attempting to resume a connection with an associated target cell, an indication with a first message to resume the connection with the target cell. The indication is an indication that the wireless device is to include measurements performed by the wireless device while in a dormant state with a second message that indicates that resuming of the connection with the target cell is complete. The base station is further adapted to receive, from the wireless device, the measurements performed by the wireless device while in the dormant state with the second message.

BRIEF DESCRIPTION OF THE DRAWINGS

The accompanying drawing figures incorporated in and forming a part of this specification illustrate several aspects of the disclosure, and together with the description serve to explain the principles of the disclosure.

FIGS. 20 through 23 are flowcharts illustrating example methods implemented in a communication system in accordance with embodiments of the present disclosure.

DETAILED DESCRIPTION

Figure 1:
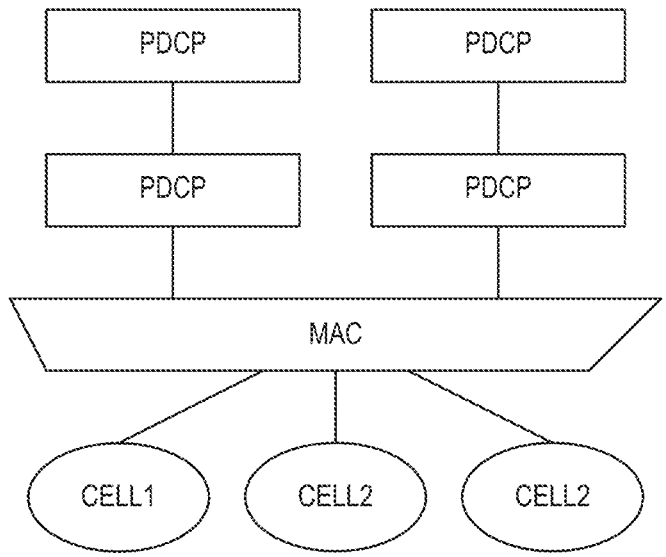
FIG. 1 illustrates aggregation of cells on the Medium Access Control (MAC) level for Carrier Aggregation (CA)
Figure 2:
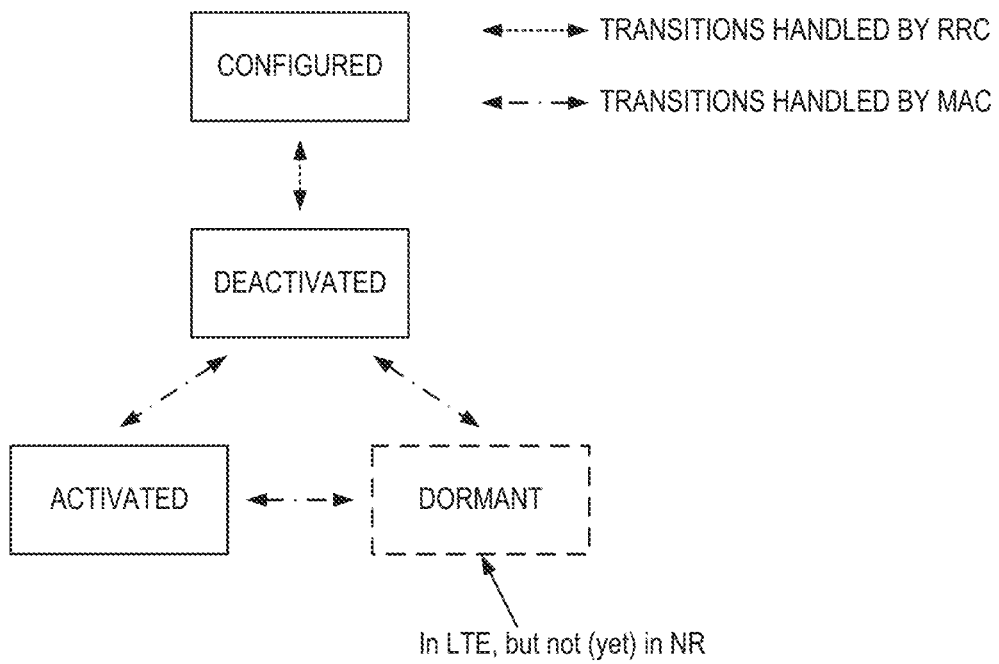
FIG. 2 illustrates transition between different states.
Figure 3:
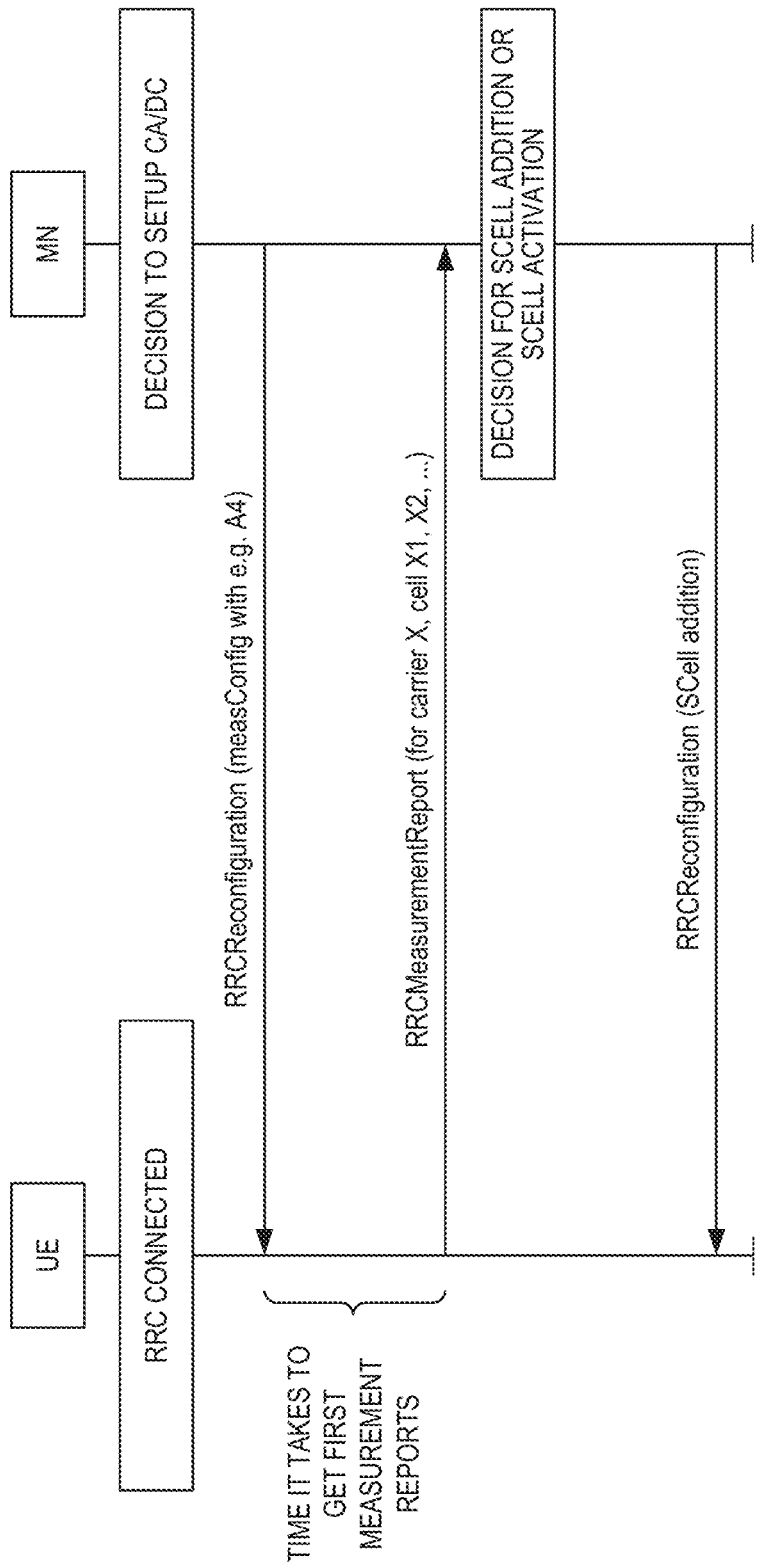
FIG. 3 illustrates a process in which a network decides to setup CA or Dual Connectivity (DC) for a User Equipment (UE)
Figure 4:
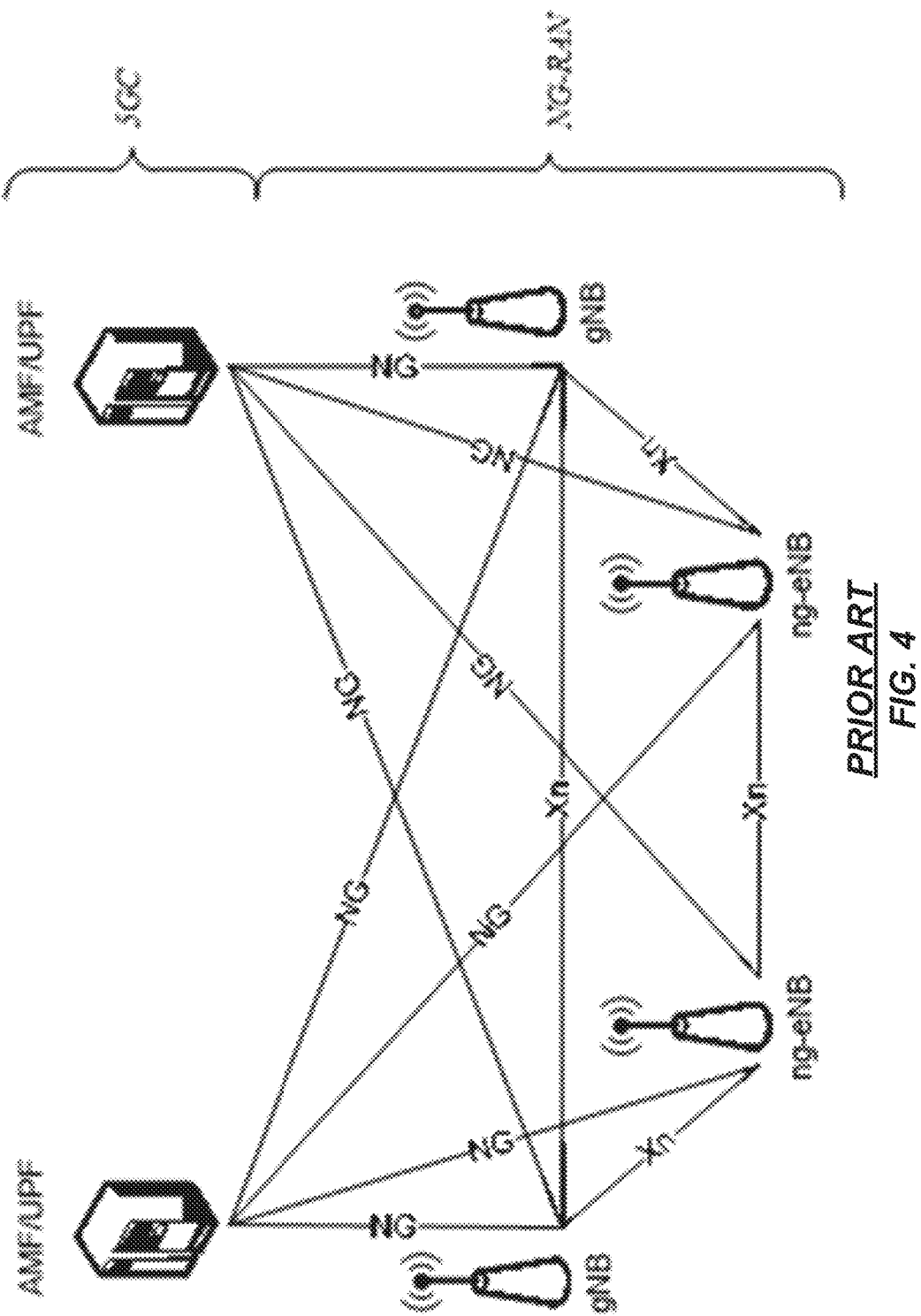
FIG. 4 illustrates the Fifth Generation (5G) System (5GS) architecture containing the 5G Core (5GC) and Next Generation Radio Access Network (NG-RAN)
Figure 5:
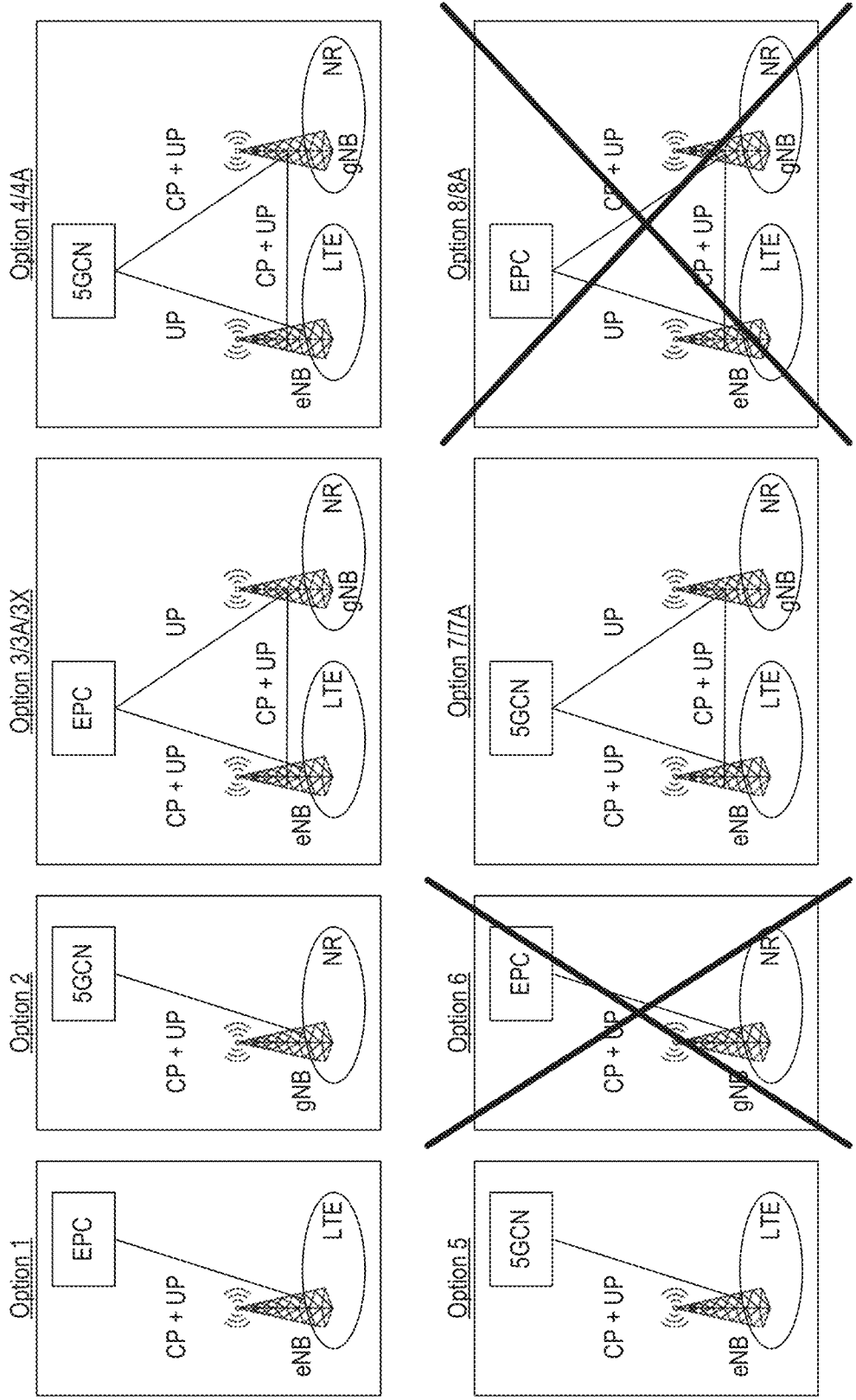
FIG. 5 illustrates different scenarios for Long Term Evolution (LTE) and New Radio (NR) interworking.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless device.

Radio Access Node: As used herein, a "radio access node" or "radio network node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), and a relay node.

Core Network Node: As used herein, a "core network node" is any type of node in a core network. Some examples of a core network node include, e.g., a Mobility Management Entity (MME), a Packet Data Network Gateway (P-GW), a Service Capability Exposure Function (SCEF), or the like.

Wireless Device: As used herein, a "wireless device" or "wireless terminal" is any type of device that has access to (i.e., is served by) a cellular communications network by wirelessly transmitting and/or receiving signals to a radio access node(s). Some examples of a wireless device include, but are not limited to, a User Equipment (UE) in a 3GPP network (e.g., a LTE network or a NR network) and a Machine Type Communication (MTC) device.

Network Node: As used herein, a "network node" is any node that is either part of the RAN or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

The problem addressed in the present disclosure is how early idle measurements in the Release 15 baseline solution are provided to the network, so the network may quickly setup Carrier Aggregation (CA) and/or Dual Connectivity (DC) (which may include Evolved Universal Terrestrial Radio Access Network (E-UTRAN) NR DC (EN-DC)).

For a UE in RRC_IDLE without context in LTE or RRC_IDLE NR, the earliest measurements to be obtained in RRC_CONNECTED (i.e., without the Release 15 feature like solution for early measurements performed in idle) are those that could be obtained by providing the UE with an RRCReconfiguration with a measurement configuration (e.g., measConfig with A4 events configured for carriers that are candidates for CA) before security is setup (e.g., multiplexed with the RRCSetup). At that point, the UE enters RRC_CONNECTED and starts to perform connected mode measurements. Then, the UE transmits the RRCSetupComplete and the network initiates security mode command. The UE can only then get the first RRCReconfiguration message after security has been activated so Signaling Radio Bearers (SRBs)/Data Radio Bearers (DRBs) may be added. At any point in time after security is activated, the first measurements (e.g., triggered by an A4 event) may be transmitted. However, as the network is not aware of UE capabilities related to if the UE supports certain carriers or not, in practice it may take some time until the network configures the UE with measurements during the transition from RRC_IDLE to RRC_CONNECTED. Hence, the feature standardized in Release 15 for idle measurements may indeed provide measurements to the network earlier than the first measurements triggered by the measConfig provided in RRC_CONNECTED.

Observation 1: Release 15 solution from LTE may provide early measurements when the UE transitions from RRC_IDLE to RRC_CONNECTED.

For a UE in RRC_IDLE with stored Access Stratum (AS) context in LTE Evolved Packet Core (EPC) or RRC_INACTIVE NR or enhanced LTE (eLTE) (i.e., LTE connected to 5G Core (5GC), where RRC_INACTIVE state is also supported), the earliest measurements to be obtained in RRC_CONNECTED (i.e., without the Release 15 feature like solution for early measurements performed in idle) are those that could be configured by providing the UE with a measConfig with A4 events configured for carriers that are candidates for CA in the RRCResume message, so at that point the UE starts to perform measurements upon entering RRC_CONNECTED, as shown below:

```
RRCResume-IEs ::=            SEQUENCE {
    radioBearerConfig            RadioBearerConfig
OPTIONAL, -- Need M
    masterCellGroup              OCTET STRING (CONTAINING
CellGroupConfig)                 OPTIONAL, -- Need
M
    measConfig                   MeasConfig
OPTIONAL, -- Need M
    fullConfig                   ENUMERATED {true}
OPTIONAL, -- Need N
```

Figure 6:
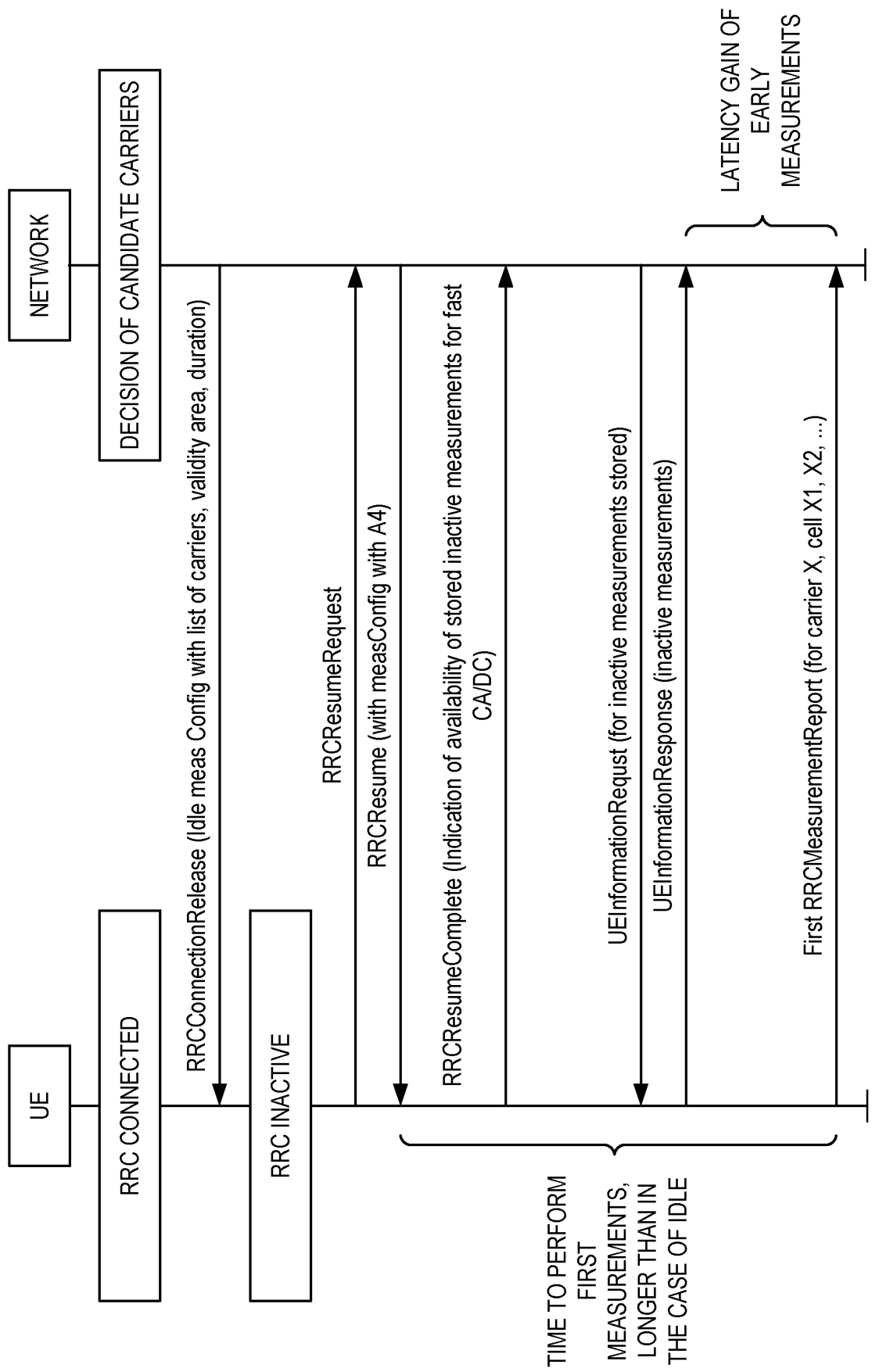
FIG. 6 illustrates a procedure in which a UEInformationRequest and a UEInformationResponse are used to obtain measurements performed by a UE when the UE was in an inactive state after the UE has resumed its connection.

Then, after a few hundred milliseconds, the first measurement report may be triggered and transmitted. If instead the existing solution of Release 15 is implemented, the UE would be configured with measurements to be performed in idle for certain carrier frequencies and, upon indicating in RRCResumeComplete that these are available, the network may initiate the procedure to request these measurements. Though it is likely that the idle mode measurements will be received earlier than measurements performed according to configurations received in the resume message, there is still a need to wait for the resume complete message to be transmitted, followed by the UE information request and response, before the network gets the idle mode measurements (see FIG. 6).

In addition to that, an RRCReconfiguration message has to be sent to configure the UE with the Master Cell Group (MCG) Secondary Cells (SCells) or/and Secondary Cell Group (SCG) cells based on the received measurements.

Certain aspects of the present disclosure and their embodiments may provide solutions to the aforementioned or other challenges. Systems and methods are disclosed herein for reporting of early measurements performed by a wireless device while in a dormant state in an efficient manner.

Embodiments of the present disclosure provide a method at a wireless terminal or UE for measurement reporting during a transition from a dormant state (e.g., RRC_INACTIVE or RRC_IDLE with or without context information) to a connected state (e.g., RRC_CONNECTED) to assist the network to perform a UE reconfiguration (e.g., handovers; reconfiguration with sync; SCG addition, removal, or modification; SCell addition, removal, or modification; etc.). In some embodiments, the method comprises one or more of the following actions at the UE:
 (Optional) Identifying that a target cell in the network that the UE is camping to and to which the UE is trying to resume supports reporting of early measurements performed in a dormant state(s) (e.g., idle and/or inactive state) (e.g., supports early measurement reporting as described in the method);
 (Optional) Including, in the Radio Resource Control (RRC) Resume Request like message (e.g., RRCResumeRequest) to be transmitted to the target cell, an indication that the UE has available measurements performed in a dormant state (e.g., RRC_IDLE or RRC_INACTIVE). In the case of a Resume Request, that message also includes an Inactive Radio Network Temporary Identifier (I-RNTI) (UE AS context identifier), a security token (e.g., resume Message Authentication Code for Integrity (MAC-I)), and a cause value;
 Receiving, from the network with the RRC Resume like message (e.g., RRCResume or RRCConnectionResume), an indication that the UE is to include early measurements performed in a dormant state (e.g., idle/inactive) in an RRC Resume Complete like message (e.g., with an RRCResumeComplete or RRCConnectionResumeComplete message) or in a separate message multiplexed (e.g., in the same radio frame) with the RRC Resume Complete like message or a separate message in a radio frame different from the radio frame used to send the Resume Complete like message, if these are available;
 Transmitting available measurements performed in dormant state (e.g., RRC_IDLE with AS Context, RRC_IDLE or RRC_INACTIVE) with an RRC Resume Complete like message (e.g., RRCResumeComplete or RRCConnectionResumeComplete) or a separate message multiplexed (e.g., in the same radio frame) with the Resume Complete like message or a separate message in a radio frame different from the radio frame used to send the Resume Complete like message; and
 (Optional) Receiving a reconfiguration from the network in an RRC Reconfiguration like message (e.g., RRCReconfiguration, RRCConnectionReconfiguration) to add, modify, remove, change state (activate/deactivate/etc.) SCGs, SCell(s), perform handovers, or any other action that may be assisted by early measurements) and applying the reconfiguration.

Embodiments of the present disclosure also provide a method at a target network node associated to a target cell where a wireless terminal or UE is trying to resume. In some embodiments, the method comprises one or more of the following actions at the target network node:
 (Optional) Indicating that a target cell supports reporting of early measurements performed in a dormant state(s) (e.g., idle and/or inactive state) (e.g., reporting of early measurements as described in the method), e.g. by broadcasting an indication;
 (Optional) Identifying that a UE trying to resume a connection at that node or target cell has available measurements performed in a dormant state (e.g., RRC_IDLE or RRC_INACTIVE);
 Indicating to the UE trying to resume the connection that the UE is to include early measurements performed in dormant state (e.g., idle/inactive) in an RRC Resume Complete like message (e.g., with an RRCResumeComplete or RRCConnectionResumeComplete) or in a separate message multiplexed (e.g., in the same radio frame) with the RRC Resume Complete like message or a separate message in a radio frame different from the radio frame used to send the Resume Complete like message, if these are available;
 Receiving measurements performed in dormant state (e.g., RRC_IDLE with AS Context, RRC_IDLE or RRC_INACTIVE) with an RRC Resume Complete like message (e.g., RRCResumeComplete or RRCConnectionResumeComplete) or in a separate message multiplexed (e.g., in the same radio frame) with the RRC Resume Complete like message or a separate message in a radio frame different from the radio frame used to send the Resume Complete like message;
 Upon receiving early measurements, performing one or more actions such as, e.g., deciding to keep the existing resumed UE configuration and/or add, remove, modify SCG configurations and/or add, remove, or modify SCell configurations of the MCG and/or SCG, and/or activate or deactivate the state of configured SCells; and
 (Optional) Sending a reconfiguration to the UE the network in an RRC Reconfiguration like message (e.g., RRCReconfiguration, RRCConnectionReconfiguration) to add, modify, remove, change state (activate/deactivate/etc.) SCGs, SCell(s), perform handovers, or any other action that may be assisted by early measurements).

In some embodiments, early measurements performed by a UE in a dormant state (e.g., RRC_IDLE or RRC_INACTIVE state) are transmitted with an RRC Resume Complete like message. In some embodiments, methods are disclosed to make this transmission possible (e.g., methods that solve, e.g., how the network is aware that the UE may have measurements available, etc.).

Certain embodiments may provide one or more of the following technical advantage(s). For example, some embodiments provide the advantage that the UE may report measurements performed in a dormant state (e.g., RRC_IDLE or RRC_INACTIVE) at the same time the UE sends an RRC Resume Complete like message (either multiplexed with it or including in the message) so that, right after receiving that message, the network may, e.g., setup, remove, and/or modify SCGs; setup, remove, and/or modify SCells for MCGs and/or SCGs; and/or activate or deactivate SCells. Compared to the baseline solution standardized in Release 15, these measurements may be available one Round Trip Time (RTT) earlier, as in the baseline solution, the network only sends the UEInformationRequest message after it receives the RRCResumeComplete message.

It should be noted that the one RTT latency reduction in setting up the UE with the proper CA/DC configuration is a lower bound because tens of milliseconds may elapse, depending on network load and radio conditions, between the sending of the UEInformationRequest and the reception of the measurement results in the UEInformationResponse. So in reality, the methods proposed by the present disclosure may end up making it possible to configure the UE with the proper CA/DC configuration tens of milliseconds earlier as compared to the LTE Release 15 solution.

Figure 7:
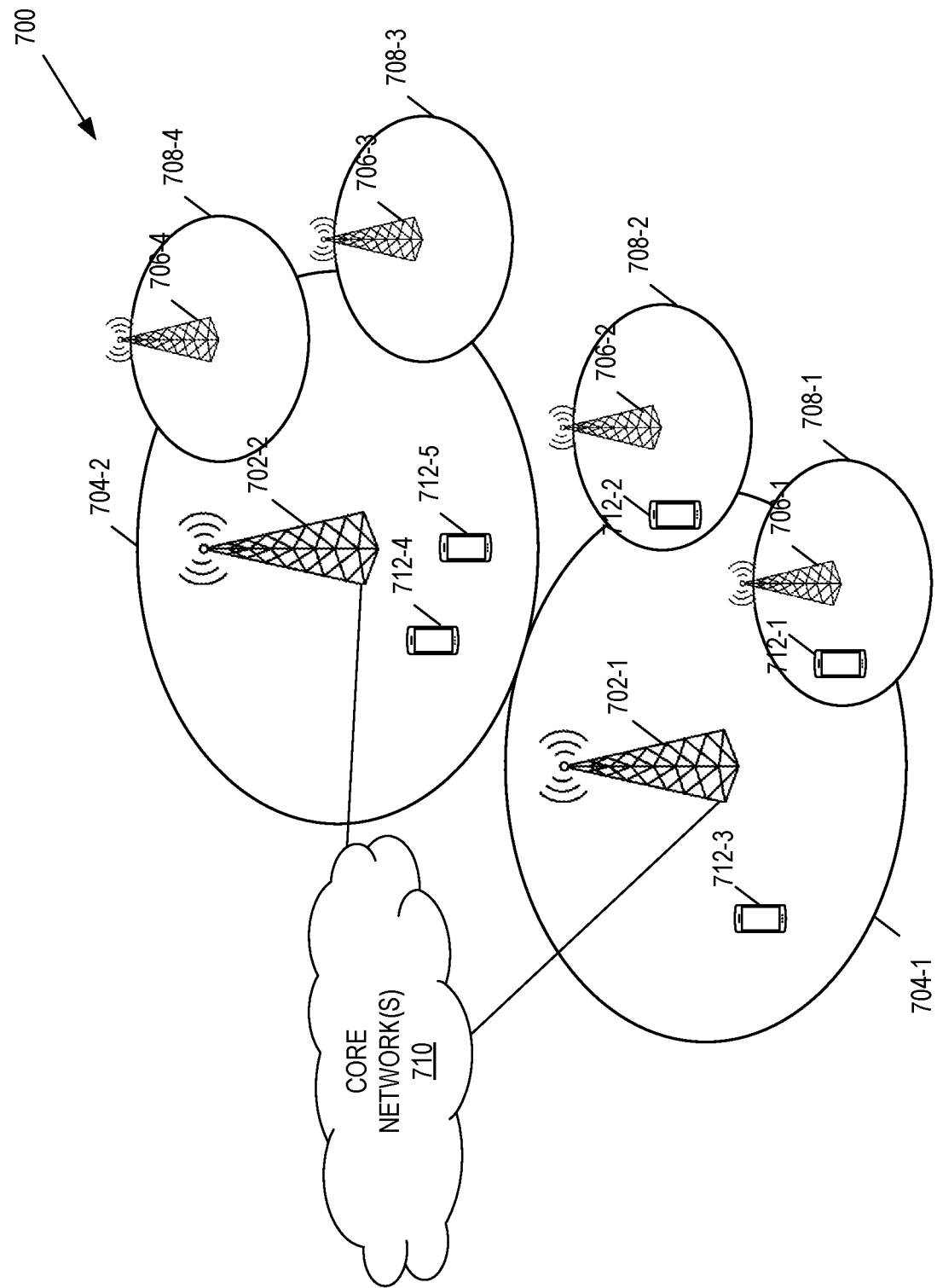
FIG. 7 illustrates one example of a cellular communications network in which embodiments of the present disclosure may be implemented.

In this regard, FIG. 7 illustrates one example of a cellular communications network 700 in which embodiments of the present disclosure may be implemented. In the embodiments described herein, the cellular communications network 700 is a 5G NR network, an LTE network, or a network providing interworking between LTE and NR, as described above. In this example, the cellular communications network 700 includes base stations 702-1 and 702-2, which in LTE are referred to as eNBs and in 5G NR are referred to as gNBs, controlling corresponding macro cells 704-1 and 704-2. The base stations 702-1 and 702-2 are generally referred to herein collectively as base stations 702 and individually as base station 702. Likewise, the macro cells 704-1 and 704-2 are generally referred to herein collectively as macro cells 704 and individually as macro cell 704. The cellular communications network 700 may also include a number of low power nodes 706-1 through 706-4 controlling corresponding small cells 708-1 through 708-4. The low power nodes 706-1 through 706-4 can be small base stations (such as pico or femto base stations) or Remote Radio Heads (RRHs), or the like. Notably, while not illustrated, one or more of the small cells 708-1 through 708-4 may alternatively be provided by the base stations 702. The low power nodes 706-1 through 706-4 are generally referred to herein collectively as low power nodes 706 and individually as low power node 706. Likewise, the small cells 708-1 through 708-4 are generally referred to herein collectively as small cells 708 and individually as small cell 708. The base stations 702 (and optionally the low power nodes 706) are connected to a core network(s) 710. For example, the core network 710 may be a 5GC or an EPC. In some other embodiments, the core network(s) 710 may include both a 5GC and an EPC, in which case some base stations 702 (e.g., eNBs) are connected to the EPC and other base stations 702 (e.g., gNB or ng-eNBs) are connected to the 5GC.

The base stations 702 and the low power nodes 706 provide service to wireless devices 712-1 through 712-5 in the corresponding cells 704 and 708. The wireless devices 712-1 through 712-5 are generally referred to herein collectively as wireless devices 712 and individually as wireless device 712. The wireless devices 712 are also sometimes referred to herein as UEs.

Now, a discussion of some example embodiments of the present disclosure will be provided.

In the present disclosure, the measurement configuration provided to the UE in RRC_IDLE has not been disclosed in detail and is not part of the core of the present disclosure. One may assume, as an example, at least the existing solution in Release 15 in LTE where the UE is provided with a list of carriers, either through broadcasted or dedicated signaling, whose measurements to be performed may also be indicated, i.e. Reference Signal Received Power (RSRP) and/or Reference Signal Received Quality (RSRQ). Other configuration may also be present, e.g., validity area, timers, list of cells, etc. Also notice that the fundamental aspect is that, upon resume, the UE has idle/inactive measurements available that may be provided to the network to speed up the setup of CA and/or any form of dual/multi-radio connectivity.

Below an example of a possible measurement configuration for these early measurements is provided:

MeasIdleConfig information element

```
-- ASN1START
MeasIdleConfigSIB-r15 ::= SEQUENCE {
    measIdleCarrierListEUTRA-r15        EUTRA-CarrierList-r15,
    . . .
}
MeasIdleConfigDedicated-r15 ::=         SEQUENCE {
    measIdleCarrierListEUTRA-r15        EUTRA-CarrierList-r15
    OPTIONAL, -- Need OR
    measIdleDuration-r15                ENUMERATED {sec10, sec30, sec60,
sec120,
                                                    sec180, sec240, sec300, spare},
    . . .
}
EUTRA-CarrierList-r15 ::= SEQUENCE (SIZE (1..maxFreqIdle-r15))
OF MeasIdleCarrierEUTRA-r15
MeasIdleCarrierEUTRA-r15::=              SEQUENCE {
    carrierFreq-r15                      ARFCN-ValueEUTRA-r9,
    allowedMeasBandwidth-r15             AllowedMeasBandwidth,
    validityArea-r15                     CellList-r15
    OPTIONAL,                           -- Need OR
    measCellList-r15                     CellList-r15
    OPTIONAL,                           -- Need OR
    reportQuantities                     ENUMERATED {rsrp, rsrq, both},
    qualityThreshold-r15                 SEQUENCE {
        idleRSRP-Threshold-r15               RSRP-Range
    OPTIONAL,                           -- Need OR
        idleRSRQ-Threshold-r15               RSRQ-Range-r13
    OPTIONAL                            -- Need OR
    }                                                OPTIONAL, --
Need OR
    . . .
}
CellList-r15 ::=   SEQUENCE (SIZE (1..maxCellMeasIdle-r15))
OF PhysCellIdRange
-- ASN1STOP
```

In the present disclosure, the exact measurements to be reported to the UE during the transition to RRC_CONNECTED has not been disclosed in detail and is not part of the core of the present disclosure. One may assume, simply as an example, at least the existing solution in Release 15 in LTE, as shown below:

```
UEInformationResponse-v1530-IEs ::= SEQUENCE {
    measResultListIdle-r15              MeasResultListIdle-r15
    OPTIONAL,
    flightPathInfoReport-r15            FlightPathInfoReport-r15
    OPTIONAL,  nonCriticalExtension                    SEQUENCE { }
        OPTIONAL
}
MeasResultListIdle-r15 ::= SEQUENCE (SIZE
(1..maxIdleMeasCarriers-r15)) OF MeasResultIdle-r15
MeasResultIdle-r15 ::= SEQUENCE {
    measResultServingCell-r15           SEQUENCE {
        rsrpResult-r15                  RSRP-Range,
        rsrqResult-r15                  RSRQ-Range-r13
    },
    measResultNeighCells-r15            CHOICE {
        measResultIdleListEUTRA-r15             MeasResultIdleListEUTRA-
r15,
        ...
    }                                                OPTIONAL,
    ...
}
MeasResultIdleListEUTRA-r15 ::= SEQUENCE (SIZE
(1..maxCellMeasIdle-r15)) OF MeasResultIdleEUTRA-r15
MeasResultIdleEUTRA-r15 ::= SEQUENCE {
    carrierFreq-r15                     ARFCN-ValueEUTRA-r9,
    physCellId-r15                      PhysCellId,
    measResult-r15                      SEQUENCE {
        rsrpResult-r15                      RSRP-Range,
        rsrqResult-r15                      RSRQ-Range-r13
    },
    ...
}
```

The present disclosure comprises a method at a wireless terminal (e.g., a UE) for measurement reporting during a transition from a dormant state to connected state. In the context of the present disclosure, one should interpret dormant state as a protocol state (like an RRC state) where the UE performs actions optimized for power savings, such as:
  RRC_IDLE without stored AS context;
  RRC_IDLE with stored AS context; or
  RRC_INACTIVE.

As the method comprises the reporting of measurements performed in a dormant state when the UE is trying to resume, it is important to mention that the method covers the case where the UE is suspended in one Radio Access Technology (RAT) (e.g., RRC_CONNECTED to RRC_IDLE or RRC_INACTIVE) and tries to resume in another RAT (e.g., RRC_INACTIVE or RRC_IDLE to RRC_CONNECTED), such as in the following cases:
  UE is suspended in NR and resumes in LTE;
  UE is suspended in LTE and resumes in NR;
  UE is suspended in NR and resumes in NR;
  UE is suspended in LTE and resumes in LTE;
  Or, in more general terms, UE is suspended in RAT-1 and resumes in RAT-2, where RAT-1 and RAT-2 may be the same or different RATs.

Figure 8:
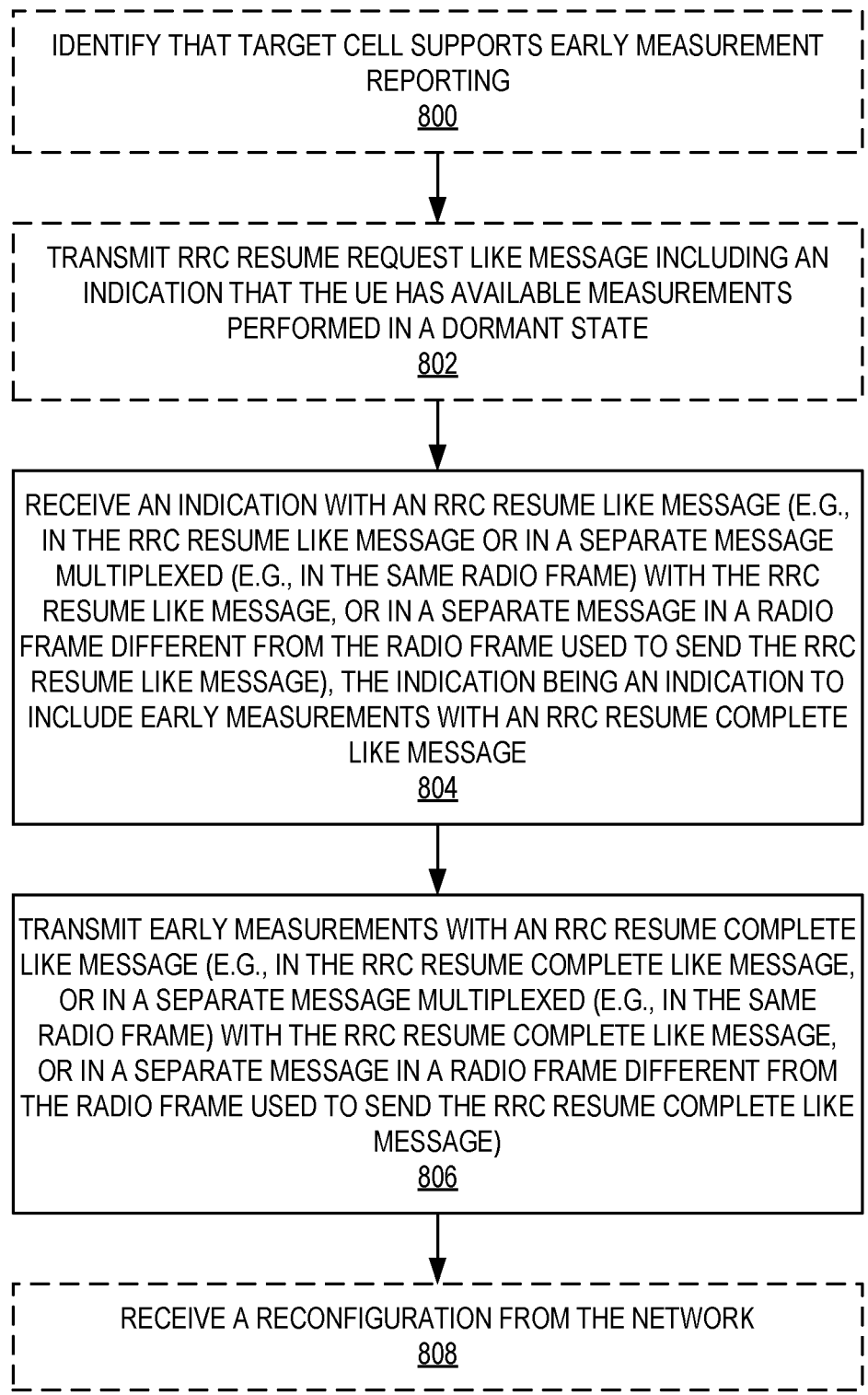
FIG. 8 illustrates a method performed by a UE in which early measurements (i.e., idle or dormant mode measurements) performed by the UE when in an idle/dormant state are reported to the network with an Radio Resource Control (RRC) Resume-like message in accordance with some embodiments of the present disclosure.

In the present disclosure, embodiments of a method at a wireless terminal (e.g., UE) for measurement reporting during a transition from a dormant state (e.g., RRC_INACTIVE) to RRC_CONNECTED to assist the network to perform a UE reconfiguration (e.g., handovers, reconfiguration with sync, SCG addition/removal/modification, SCell addition/removal/modification, etc.) are provided. As illustrated in FIG. 8, in some embodiments, the method comprises the following steps. Note that while these actions are referred to as "steps", these actions may be performed in any suitable order and are not limited to the order in which they are presented here, unless otherwise stated or required. Further, optional steps are represented in FIG. 8 by dashed lines.

Step 800 (Optional): The UE identifies that a target cell in the network that the UE is camping on and to which the UE is trying to resume supports reporting of early measurements performed in dormant state(s) (e.g., idle and/or inactive state) (e.g., supports early measurement reporting as described in the method).

In a first variant, the identification of step 800 is performed by the UE when the UE reads a specific field(s) in system information, for example, in SIB1 (e.g. or SIB2, in LTE). It may be the case that different solutions are defined for early measurement upon transition to RRC_CONNECTED depending whether the UE is resuming from RRC_INACTIVE or from RRC_IDLE. For example, one possibility is to define that the same solutions as in LTE Release 15 are performed (e.g., required by standards) for NR when the UE comes from RRC_IDLE, while the solution disclosed in the method of the present disclosure is performed (e.g., required by standard) for NR when the UE comes from RRC_INACTIVE. That could make sense as the security solution in NR for RRC_INACTIVE UEs has had enhancements (security is activated before receiving RRCResume, RRCResume is encrypted, etc.). It may be the case that different solutions are defined for early measurement upon transition to RRC_CONNECTED depending on network implementation e.g., some nodes may implement one solution, other nodes may implement another solution. The network node would then indicate which solution to use for early measurement reporting. In that case, some prioritization may be defined in case of both solutions being supported by the network (e.g., if the UE supports both solutions, the solution disclosed in this method is used by the UE).

A possible implementation in LTE is shown as follows:

| SystemInformationBlockType2 information element |
| --- |
| -- ASN1START<br>SystemInformationBlockType2 ::=    SEQUENCE {<br>. . .<br>    idleModeMeasurements-r15         ENUMERATED {true} OPTIONAL, -- Need OR<br>    idleModeMeasurementsResumeComplete-r16    ENUMERATED {true}    OPTIONAL, -- Need OR<br>. . .<br>} |

In this possible implementation in LTE, SIB2 defines a parameter idleModeMeasurementsResumeComplete-r16 that, when set to true, indicates that the target cell supports early measurement reporting in accordance with this method. The UE can then identify if the target cell supports early measurement reporting by reading this parameter.

A possible implementation in NR is shown as follows:

| SIB1 message |
| --- |
| -- ASN1START<br>-- TAG-SIB1-START<br>SIB1 ::=      SEQUENCE {<br>. . .<br>    idleModeMeasurements-r16         ENUMERATED {true} OPTIONAL, -- Need OR<br>    inactiveModeMeasurementsResumeComplete-r16    ENUMERATED {true}    OPTIONAL, -- Need OR<br>. . .<br>} |

In this possible implementation in NR, SIB1 defines a parameter inactiveModeMeasurementsResumeComplete that, when set to true, indicates that the target cell supports early measurement reporting in accordance with this method. The UE can then identify if the target cell supports early measurement reporting by reading this parameter.

In a second variant, the identification of step 800 is performed by the UE by receiving, from the network, a list of cells when the UE is being suspended or released, where each cell in the list supports the feature for the transmission of early measurements upon transition to RRC_CONNECTED. That may be coupled to other concepts such as, e.g., a cell within the RAN configuration area. Perhaps a signaling optimization contains a flag indication whether that concept is the same as the RAN configuration area.

In a third variant, the identification of step 800 is performed by the UE receiving the identification that the cell supports early measurements in the RRC Resume like message (e.g., RRCResume, RRCConnectionResume). The indication can then also indicate that the network sees a potential use of the measurements, if available, for the specific connection. That variant could be implemented in the RRC specifications as shown below:

| RRCResume |
| --- |
| The RRCResume message is used to resume the suspended RRC connection.<br>Signalling radio bearer: SRB1<br>RLC-SAP: AM<br>Logical channel: DCCH<br>Direction: Network to UE |

| RRCResume message |
| --- |
| -- ASN1START<br>-- TAG-RRCRESUME-START<br>RRCResume ::=          SEQUENCE {<br>    rrc-TransactionIdentifier      RRC- |

```
TransactionIdentifier,
        criticalExtensions              CHOICE {
            rrcResume                       RRCResume-IEs,
            criticalExtensionsFuture        SEQUENCE { }
        }
}
RRCResume-IEs ::=                       SEQUENCE {
        radioBearerConfig                   RadioBearerConfig
OPTIONAL, -- Need M
        masterCellGroup                     OCTET STRING
(CONTAINING CellGroupConfig)
OPTIONAL, -- Need M
        measConfig                          MeasConfig
OPTIONAL, -- Need M
        fullConfig                          ENUMERATED {true}
OPTIONAL, -- Need N
    idleModeMeasurements-r16            ENUMERATED {true}
        OPTIONAL, -- Need OR
        lateNonCriticalExtension            OCTET STRING
OPTIONAL,
        nonCriticalExtension                SEQUENCE{ }
OPTIONAL
}
-- TAG-RRCRESUME-STOP
-- ASN1STOP
```

Step 802 (Optional): The UE transmits an RRC Resume Request like message to the target cell, where the RRC Resume like message includes an indication that the UE has available measurements performed in a dormant state (e.g., RRC_IDLE or RRC_INACTIVE). In some embodiments, the RRC Resume like message also includes an I-RNTI (UE AS context identifier), a security token (e.g., resume MAC-I), and/or a cause value.

In a first variant, the RRC Resume Request like message is an RRCResumeRequest in NR for UEs coming from RRC_INACTIVE. An implementation for NR is shown for this case below (i.e., however the same principles may be applied to LTE specification):

| RRCResumeRequest |
|---|
| The RRCResumeRequest is the 48bit message used to request the resumption of a suspended RRC connection or perform an RNA update.<br>    Signalling radio bearer: SRB0<br>    RLC-SAP: TM<br>    Logical channel: CCCH<br>    Direction: UE to Network |

| RRCResumeRequest message |
|---|
| ```
-- ASN1START
-- TAG-RRCRESUMEREQUEST-START
RRCResumeRequest ::=                    SEQUENCE {
        rrcResumeRequest                    RRCResumeRequest-IEs
}
RRCResumeRequest-IEs ::=                SEQUENCE {
        resumeIdentity                      ShortI-RNTI-Value,
        resumeMAC-I                         BIT STRING (SIZE (16)),
        resumeCause                         ResumeCause,
        spare                               BIT STRING (SIZE (1))
}
RRCResumeRequest-IEs-v16xy ::=          SEQUENCE {
        idleMeasAvailable-r16               ENUMERATED{true}
        OPTIONAL,
resumeIdentity                          ShortI-RNTI-Value,
        resumeMAC-I                         BIT STRING (SIZE (16)),
        resumeCause                         ResumeCause,
        spare                               BIT STRING (SIZE (1))
}
-- TAG-RRCRESUMEREQUEST-STOP
-- ASN1STOP
``` |

| RRCResumeRequest field descriptions |
|---|
| idleMeasAvailable<br>Provides an indication that the UE has available measurements that has been performed in dormant state. | resumeCause
Provides the resume cause for the RRC connection resume request as provided by
the upper layers or RRC. The network is not expected to reject an
RRCResumeRequest due to unknown cause value being used by the UE.
resumeIdentity
UE identity to facilitate UE context retrieval at gNB.
resumeMAC-I
Authentication token to facilitate UE authentication at gNB. The 16 least significant
bits of the MAC-I calculated using the security configuration as specified in
5.3.13.3.

---

UL-CCCH1-Message

The UL-CCCH1-Message class is the set of 64bit RRC messages that may be sent from the UE
to the Network on the uplink CCCH1 logical channel.

```
-- ASN1START
-- TAG-UL-CCCH1-MESSAGE-START
UL-CCCH1-Message ::=               SEQUENCE {
        message                            UL-CCCH1-MessageType
}
UL-CCCH1-MessageType ::=           CHOICE {
        c1                                 CHOICE {
                rrcResumeRequest1                  RRCResumeRequest1,
                rrcResumeRequest1-r16              RRCResumeRequest1-r16,
                spare2 NULL,
                spare1 NULL
        },
        messageClassExtension SEQUENCE { }
}
-- TAG-UL-CCCH1-MESSAGE-STOP
-- ASN1STOP
```

---

RRCResumeRequest1

The RRCResumeRequest1 is the 64 bit message used to request the resumption of a
suspended RRC connection or perform an RNA update.
    Signalling radio bearer: SRB0
    RLC-SAP: TM
    Logical channel: CCCH1
    Direction: UE to Network RRCResumeRequest1 message

```
-- ASN1START
-- TAG-RRCRESUMEREQUEST1-START
RRCResumeRequest1 ::= SEQUENCE {
        rrcResumeRequest1         RRCResumeRequest1-IEs
}
RRCResumeRequest1-r16 ::= SEQUENCE {
        rrcResumeRequest1-r16     RRCResumeRequest1-r16-IEs
}
RRCResumeRequest1-IEs ::=          SEQUENCE {
        resumeIdentity                     I-RNTI-Value,
        resumeMAC-I                        BIT STRING (SIZE (16)),
        resumeCause                        ResumeCause,
        spare                              BIT STRING (SIZE (1))
}
RRCResumeRequest1-v16xy-IEs ::=            SEQUENCE {
        idleMeasAvailable-r16                      ENUMERATED {true}
    OPTIONAL,
        resumeIdentity                     ShortI-RNTI-Value,
        resumeMAC-I                        BIT STRING (SIZE (16)),
        resumeCause                        ResumeCause,
}
-- TAG-RRCRESUMEREQUEST1-STOP
-- ASN1STOP
```

RRCResumeRequest1-IEs field descriptions idleMeasAvailable
Provides an indication that the UE has available measurements that has been
performed in dormant state.
resumeCause
Provides the resume cause for the RRCResumeRequest1 as provided by the
upper layers or RRC. A gNB is not expected to reject an RRCResumeRequest1
due to unknown cause value being used by the UE.

-continued resumeIdentity
UE identity to facilitate UE context retrieval at gNB.
resumeMAC-I
Authentication token to facilitate UE authentication at gNB. The 16 least significant
bits of the MAC-I calculated using the security configuration as specified in
5.3.13.3.

In another variant of step 802, information regarding the time when the idle/inactive measurements were performed is also indicated in the RRC Resume like message. Below one possible realization is shown where the idleMeasAvailable field is included only if such measurements are available and the field contains the time when the measurements were taken. The time when the measurements were taken may indicate, to the network, the trustworthiness of the reported measurements, i.e. how accurate the quality of the reported cells may really be. There may be different variants of that, e.g. only report the time elapsed since latest sample. For example, if the UE makes latest measurements at t0 and resumes at t0+T, it would only include the value of T in the indication. This time could be an exact elapsed time since the measurements were taken or a quantized value (e.g., only times between 0 and 5 seconds are reported, with 100 milliseconds (ms) granularity, and all values greater than 5 seconds are reported as 5 seconds).

The network could configure the UE with a time value (e.g., maxEarlyMeasReportTime) (e.g., in the suspend configuration in the release message or hardcoded in the RRC specifications), or could broadcast the time value, which indicates that the UE should not report idle mode measurements that are older than the maxEarlyMeasReportTime.

Since the RRC Resume Request message is size limited, in some embodiments, the larger RRCResumeRequest1 message (see below) can be more appropriate to also include the time information, which fits 16 bits more than the RRCResumeRequest message. However, it is possible to use the RRCResumeRequest message as well. By using the 24 bit shortI-RNTI-Value (instead of the 40 bit full I-RNTI-Value), the 16 additional bits can be used to signal a time stamp. The 16 extra bits are used to signal the time stamp in the 'Binary Decimal Coding' scheme, where every decimal digit is encoded as 4 bits (a ShortAbsoluteTimeInfo Information Element (IE) can be introduced, e.g., that is 2 bytes long (as compared to the AbsoluteTimeInfo IE that is defined in LTE which is 48 bits)). Thus, two digits for minutes and two digits for seconds amounts to 16 bits. The spare value can be optionally used to indicate whether the idle measurements are available or not (if the time information is included then the spare bit usage for early measurement indication is redundant).

| RRCResumeRequest1 message |
|---|

```
-- ASN1START
-- TAG-RRCRESUMEREQUEST1-START
RRCResumeRequest1 ::= SEQUENCE {
        rrcResumeRequest1        RRCResumeRequest1-IEs
}
RRCResumeRequest1-r16 ::= SEQUENCE {
        rrcResumeRequest1-r16    RRCResumeRequest1-r16-IEs
}
RRCResumeRequest1-IEs ::=        SEQUENCE {
    resumeIdentity                   Short I-RNTI-Value,
    resumeMAC-I                      BIT STRING (SIZE (16)),
    resumeCause                      ResumeCause,
    spare                            BIT STRING (SIZE (1))
}
RRCResumeRequest1-v16xy-IEs ::=          SEQUENCE {
    idleMeasAbsoluteTime-r16         ShortAbsoluteTimeInfo-r16
    OPTIONAL,
    resumeIdentity                           ShortI-RNTI-Value,
    resumeMAC-I                      BIT STRING (SIZE (16)),
    resumeCause                      ResumeCause,
}
ShortAbsoluteTimeInfo-r16 ::=            BIT STRING (SIZE (16))
-- TAG-RRCRESUMEREQUEST1-STOP
-- ASN1STOP
```

RRCResumeRequest1-IEs field descriptions idleMeasAbsoluteTime
Provides an indication that the UE has available measurements that has been
performed in dormant state and the time when the measurements were
performed in the ShortAbsoluteTimeInfo IE. The IE ShortAbsoluteTimeInfo
indicates an absolute time in a format MM:SS and using BCD encoding. The
first/ leftmost bit of the bit string contains the most significant bit of the most
significant digit of the minute and so on.
resumeCause
Provides the resume cause for the RRCResumeRequest1 as provided by the
upper layers or RRC. A gNB is not expected to reject an RRCResumeRequest1
due to unknown cause value being used by the UE.
resumeIdentity -continued UE identity to facilitate UE context retrieval at gNB.
resumeMAC-I
Authentication token to facilitate UE authentication at gNB. The 16 least significant
bits of the MAC-I calculated using the security configuration as specified in
5.3.13.3.

In one example realization based on the above structure, the UE sends the time information if:
- the provided grant for the RRC Resume like message is sufficient to include the time information while indicating that the UE is to use the short-RNTI; or
- the network has indicated (e.g., in the NR SIB1 or LTE SIB2 messages discussed above), if it requires the time information for idle mode measurements.

Another realization is shown below, where a new logical channel is introduced (e.g., UL-CCCH2) which could provide a much larger grant and separate field for availability and time information. Since the shortAbsoluteTimeInfo IE is 16 bits and two optional flags indicate whether there are idle measurements available and whether there is time information available, the new RRCResumeRequest2 message would be 18 bits larger than the RRCResumeRequest1 message (i.e., 114 bits).

| UL-CCCH2-Message |
| --- |
| The UL-CCCH2-Message class is the set of 82 bit RRC messages that may be sent from the UE to the Network on the uplink CCCH2 logical channel.<br>-- ASN1START<br>-- TAG-UL-CCCH2-MESSAGE-START<br>UL-CCCH2-Message ::=                    SEQUENCE {<br>    message                                        UL-CCCH2-MessageType<br>}<br>UL-CCCH2-MessageType ::=                CHOICE {<br>    c1                                              CHOICE {<br>        rrcResumeRequest2                           RRCResumeRequest2,<br>        spare3 NULL,<br>        spare2 NULL,<br>        spare1 NULL<br>    },<br>    messageClassExtension SEQUENCE { }<br>}<br>-- TAG-UL-CCCH1-MESSAGE-STOP<br>-- ASN1STOP |

- RRCResumeRequest2

The RRCResumeRequest2 is the 114 bit message used to request the resumption of a suspended RRC connection or perform an RNA update.
    Signalling radio bearer: SRB0
    RLC-SAP: TM
    Logical channel: CCCH2
    Direction: UE to Network

| RRCResumeRequest2 message |
| --- |
| -- ASN1START<br>-- TAG-RRCRESUMEREQUEST2-START<br>RRCResumeRequest2 ::=                           SEQUENCE {<br>        rrcResumeRequest2                       RRCResumeRequest2-IEs<br>}<br>RRCResumeRequest2-IEs ::=                       SEQUENCE {<br>    idleMeasAvailable-r16                       ENUMERATED{true}<br>    OPTIONAL,<br>    idleMeasAbsoluteTime-r16                    ShortAbsoluteTimeInfo-r16<br>    OPTIONAL,<br>        resumeIdentity                          I-RNTI-Value,<br>        resumeMAC-I                             BIT STRING (SIZE (16)),<br>        resumeCause                             ResumeCause,<br>        spare                                   BIT STRING (SIZE (1))<br>}<br>ShortAbsoluteTimeInfo-r16 ::=                   BIT STRING (SIZE (16))<br>-- TAG-RRCRESUMEREQUEST-STOP<br>-- ASN1STOP |

| RRCResumeRequest field descriptions |
| --- |
| idleMeasAvailable<br>Provides an indication that the UE has available measurements that has been performed in dormant state.<br>idleMeasAvailable<br>Provides an indication that the UE has available measurements that has been performed in dormant state and the time when the measurements were | performed in the ShortAbsoluteTimeInfo IE. The IE ShortAbsoluteTimeInfo indicates an absolute time in a format MM:SS and using BCD encoding. The first/ leftmost bit of the bit string contains the most significant bit of the most significant digit of the minute and so on.
resumeCause
Provides the resume cause for the RRC connection resume request as provided by the upper layers or RRC. The network is not expected to reject an RRCResumeRequest due to unknown cause value being used by the UE.
resumeIdentity
UE identity to facilitate UE context retrieval at gNB.
resumeMAC-I
Authentication token to facilitate UE authentication at gNB. The 16 least significant bits of the MAC-I calculated using the security configuration as specified in 5.3.13.3.

- AbsoluteTimeInfo

The IE AbsoluteTimeInfo indicates an absolute time in a format YY-MM-DD HH:MM:SS and using BCD encoding. The first/ leftmost bit of the bit string contains the most significant bit of the most significant digit of the year and so on.

AbsoluteTimeInfo information element

```
-- ASN1START
AbsoluteTimeInfo-r10 ::=    BIT STRING (SIZE (48))
-- ASN1STOP
```

Note that in the above the usage of the ShortAbsoluteTimeInfo is just an example, and there are other possibilities. For example, 1 byte, or an even fewer number of bits, can be used to encode the time information as measurements that are older than a certain duration are likely not reliable and thus not useful for the network to decide the proper CA/DC configuration. For example, only 4 bits are used to encode the elapsed time, where 0001 represents 100 ms, 0010 represents 200 ms, . . . 1111 represents 15*20=1500 ms or above.

Also, the RRCResumeRequest2 is just an example, and either RRCResumeRequest or RRCResumeRequest1 could be used (and correspondingly RRCConnectionResumeRequest in LTE).

In one example realization based on the above structure, the UE sends the time information if:
 the provided grant for the RRCResumeRequest2 message is sufficient to include the time information; or
 the network has indicated (e.g., in the NR SIB1 or LTE SIB2 messages discussed above) if it requires the time information for idle mode measurements.

In one embodiment, the network could indicate (e.g., in the NR SIB1 or LTE SIB2) the oldest idle mode measurement that it considers relevant. For example, if this is specified to be 100 seconds, the UE will not indicate it has available measurements unless they were performed not longer than 100 seconds ago.

In another embodiment, the network may configure the UE, upon release/suspend, with a time value (e.g., x seconds) that is the relevance limit for the measurements. Thus, if the UE resumes, it will indicate idle mode measurement availability only if the measurements are fresher than the configured time out value. In yet another embodiment, the UE may perform another idle mode measurement when this specified time value has elapsed after performing the previous idle mode measurement.

In another variant, the RRC Resume Request like message of step 802 is an RRCSetupRequest in NR for UEs coming from RRC_IDLE. In another variant, the RRC Resume Request like message of step 802 is an RRCConnectionResumeRequest in LTE for UEs coming from RRC_INACTIVE. In another variant, the RRC Resume Request like message of step 802 is an RRCConnectionResumeRequest in LTE for UEs coming from RRC_IDLE with a stored AS Context. In another variant, the RRC Resume Request like message of step 802 is an RRCSetupRequest in LTE for UEs coming from RRC_IDLE with a stored AS Context. Note that this Resume Request like message in the resume case may alternatively be an RRCResumeRequest1 message, depending on the type of I-RNTI to be included in the request message (long or short). Also, note that the IEs within RRCResumeRequestand RRCResumeRequest1 cannot be extended. However, since the solutions proposed herein will be eventually addressed in Release 16, there has been created a new v16 IE by including all the fields present in Release 15 (to keep a sort of compatibility with the previous release).

The indication included in the RRC Resume Request like message may be a parameter to enable the network to quickly identify the possible need for these measurements. For example, this may enable the network to configure additional measurements in measConfig in the follow up RRCResume (or RRCConnectionResume in LTE) or the first RRCReconfiguration before security is setup when UE comes from IDLE.

In a variant of that solution, this indication is not really included in the RRC Resume Request as the target network node identifies that the UE possibly has available idle measurements thanks to the UE AS context. That may require some explicit definition that the UE AS context contains that information so that is transferred between nodes in an inter-node procedure for context fetching/context fetching request. That may be seen as an opportunistic approach as the UE may have been configured with these measurements, but the network has not received any input from the UE that the UE has these stored.

Step 804: The UE receives an indication from the network with the RRC Resume like message (e.g., RRCResume or RRCConnectionResume) that the UE is to include early measurements performed in the dormant state (e.g., idle/inactive state) in an RRC Resume Complete like message (e.g., with an RRCResumeComplete or RRCConnectionResumeComplete), or in a message multiplexed (e.g., in the same radio frame) with the RRC Resume Complete like message, or in a separate message in a radio frame different from the radio frame in which the RRC Resume Complete like message is transmitted (e.g., in the next radio frame)), if these are available.

In one variant, the indication is transmitted in the RRC Resume like message, e.g., as a specific field of that message, which may be a Boolean flag or an enumerated value (i.e., the field is present only when early measurements are requested). Thus, in this variant, the UE receives the RRC Resume like message, where the RRC Resume like message includes the indication that the UE is to include early measurements performed in the dormant state in an RRC Resume Complete like message or in a message that is multiplexed with the RRC Resume Complete like message. The RRC Resume like message is, in some embodiments, an RRCResume message in NR, or the RRCConnectionResume message in LTE. An implementation for NR (i.e., RRCResume message) is shown in the example below:

| - RRCResume |
|---|
| The RRCResume message is used to resume the suspended RRC connection.<br>Signalling radio bearer: SRB1<br>RLC-SAP: AM<br>Logical channel: DCCH<br>Direction: Network to UE |

| RRCResume message |
|---|
| -- ASN1START<br>-- TAG-RRCRESUME-START<br>RRCResume ::=                                                         SEQUENCE {<br>    rrc-TransactionIdentifier                                 RRC-TransactionIdentifier,<br>    criticalExtensions                                              CHOICE {<br>        rrcResume                                                     RRCResume-IEs,<br>        criticalExtensionsFuture                              SEQUENCE { }<br>    }<br>}<br>RRCResume-IEs ::=                                                    SEQUENCE {<br>    radioBearerConfig                                              RadioBearerConfig<br>OPTIONAL, -- Need M<br>    masterCellGroup                                                 OCTET STRING<br>(CONTAINING CellGroupConfig)                            OPTIONAL, --<br>Need M<br>    measConfig                                                          MeasConfig<br>OPTIONAL, -- Need M<br>    fullConfig                                                             ENUMERATED {true}<br>OPTIONAL, -- Need N<br>    lateNonCriticalExtension                                   OCTET STRING<br>OPTIONAL,<br>    nonCriticalExtension                                           RRCResume-IEs-v15xy<br>OPTIONAL<br>}<br>RRCResume-IEs-v15xy ::=                                         SEQUENCE {<br>    radioBearerConfig2                                            OCTET STRING<br>(CONTAINING RadioBearerConfig)                       OPTIONAL, --<br>Need M<br>    sk-Counter                                                            SK-Counter<br>OPTIONAL, -- Cond S-KeyChange<br>    nonCriticalExtension                                           RRCResume-IEs-v16xy<br>OPTIONAL<br>}<br>RRCResume-IEs-v16xy ::=                      SEQUENCE {<br>    needForEarlyMeas                              ENUMERATED {true}<br>OPTIONAL, -- Need N<br>-- Alterntive implementation is:<br>    needForEarlyMeas                              BOOLEAN<br>OPTIONAL, -- Need N<br>    nonCriticalExtension                            SEQUENCE { }<br>  OPTIONAL<br>}<br>-- TAG-RRCRESUME-STOP<br>-- ASN1STOP |

| RRCResume-IEs field descriptions |
|---|
| masterCellGroup<br>Configuration of the master cell group (NR Standalone):<br>needForEarlyMeas<br>Provides an indication that the UE should include early measurements during RRC resume procedure.<br>radioBearerConfig, radioBearerConfig2<br>Configuration of Radio Bearers (DRBs, SRBs) including SDAP/PDCP.<br>sk-Counter<br>A one-shot counter used upon refresh of $S\text{-}K_{gNB}$ or $S\text{-}K_{gNB}$ based on the newly derived $K_{gNB}$ during RRC Resume. |

| Conditional Presence | Explanation |
|---|---|
| S-KeyChange | This field is mandatory present, Need N, in case of resumption or configuration of MR-DC during RRC resume. Otherwise, the field is absent. |

In another variant, the indication of step 804 is an implicit indication from lower layers that a grant larger than the typical grant provided to an RRC Resume Complete message is provided (e.g., grant for an RRCResumeComplete message in NR). An implementation for NR for the described solution is illustrated below:

- RRCResumeComplete

The RRCResumeComplete message is used to confirm the successful completion of an RRC connection resumption.
    Signalling radio bearer: SRB1
    RLC-SAP: AM
    Logical channel: DCCH
    Direction: UE to Network RRCResumeComplete message

```
-- ASN1START
-- TAG-RRCRESUMECOMPLETE-START
RRCResumeComplete ::=                       SEQUENCE {
    rrc-TransactionIdentifier               RRC-TransactionIdentifier,
    criticalExtensions                      CHOICE {
        rrcResumeComplete                   RRCResumeComplete-IEs,
        criticalExtensionsFuture            SEQUENCE { }
    }
}
RRCResumeComplete-IEs ::=                   SEQUENCE {
    dedicatedNAS-Message                    DedicatedNAS-Message       OPTIONAL,
    selectedPLMN-Identity                   INTEGER (1..maxPLMN)       OPTIONAL,
    uplinkTxDirectCurrentList               UplinkTxDirectCurrentList  OPTIONAL,
    lateNonCriticalExtension                OCTET STRING               OPTIONAL,
    nonCriticalExtension                    RRCResumeComplete-IEs-v16xy OPTIONAL
}
RRCResumeComplete-IEs-v16xy ::=             SEQUENCE {
    grantForEarlyMeas                       ENUMERATED {true}          OPTIONAL, -- Need N
-- Alterntive implementation is:
    grantForEarlyMeas                       BOOLEAN                    OPTIONAL, -- Need N
    nonCriticalExtension                    SEQUENCE { }               OPTIONAL
}
-- TAG-RRCRESUMECOMPLETE-STOP
-- ASN1STOP
```

RRCResumeComplete-IEs field descriptions grantForEarlyMeas
Provides an indication that a larger grant is needed to include early measurements during RRC resume procedure.
selectedPLMN-Identity
Index of the PLMN selected by the UE from the plmn-IdentityList fields included in SIB1.
uplinkTxDirectCurrentList
The Tx Direct Current locations for the configured serving cells and BWPs if requested by the NW (see reportUplinkTxDirectCurrent).

In another variant, the indication of step 804 is transmitted in a separate message that is multiplexed together with the RRC Resume like message (e.g., RRCResume), e.g., in the same subframe. Thus, in this variant, the UE receives the message that is multiplexed together with RRC Resume like message, where the message that is multiplexed with the RRC Resume like message includes the indication that the UE is to include early measurements performed in the dormant state in an RRC Resume Complete like message or in a message that is multiplexed with the RRC Resume Complete like message. In some embodiments, the RRC Resume like message is an RRCResume, and the message to be multiplexed with the RRCResume is a UEInformationRequest. In the case of NR, both of these messages to be multiplexed may be encrypted as the UE may have started encryption and integrity protection after having transmitted the RRC Resume Request like message. In the case of LTE Release 13 suspend/Resume, i.e. LTE connected to EPC, the RRC Resume like message is not encrypted but integrity protected and should be transmitted first. Then, upon reception, the UE receives the Next-hop Chaining Count (NCC) and possibly other parameters, and starts security/encryption. The second message multiplexed with the RRC Resume like message may be encrypted. As the UE may have started encryption and integrity protection after having processed the RRC Resume like message, the UE shall be able to process the second message and identify the indication; hence, there is no need to change security requirements on the message containing this indication which may be the UEInformationRequest message.

In another variant, the indication of step 804 is transmitted in a separate message in a radio frame that is different from the radio frame in which the RRC Resume like message is transmitted. For example, the separate message may be transmitted in the text radio frame.

Step 806: The UE transmits measurements performed in the dormant state (e.g., RRC_IDLE with AS Context, RRC_IDLE or RRC_INACTIVE) with an RRC Resume Complete like message (e.g., RRCResumeComplete or RRCConnectionResumeComplete), if these are available. Depending on the particular embodiment, the UE transmits the measurements in the RRC Resume Complete like message in a separate message that is multiplexed (e.g., in the same radio frame) with the RRC Resume Complete like message, or in a separate message in a radio frame different from the radio frame in which the RRC Resume Complete like message is transmitted (e.g., in the next radio frame)).

In a first variant, the UE includes the measurements in the RRC Resume Complete like message, e.g. RRCResumeComplete or RRCConnectionResumeComplete. Thus, in this variant, the UE transmits the RRC Resume Complete like message that includes the measurements.

In a second variant, the UE includes the measurements in a different message (e.g., UEInformationResponse or a MeasurementReport like message that contains a modified measResultsthat contains idle mode measurements) that is not the same as the RRC Resume Complete like message, e.g. RRCResumeComplete or RRCConnectionResumeComplete), but that is multiplexed (e.g., in the same radio frame) with the RRC Resume Complete like message or sent in the radio frame soon after the radio frame used for sending the RRC Resume complete like message. In LTE and NR, both the different message and RRCResume Complete like message are encrypted and integrity protected with new security keys. Thus, in this variant, the UE transmits the different message that is multiplexed with the RRC Resume Complete like message, where this different message includes the measurements.

In another variant, if the network opportunistically requested the UE to report early measurements performed in dormant state (e.g., RRC_INACTIVE or RRC_IDLE) but for some reason the UE does not have these measurements available, the UE may indicate that lack of available measurements in the RRC Resume Complete like message. Alternatively, the absence of measurements in the message (or lack of the reception of another message that includes the measurements multiplexed with the Resume Complete like message) even though the network has requested the UE to include these could be an implicit indication to the network that the UE does not have idle measurements available.

In another variant, if the UE is coming from RRC_IDLE without any context stored, like RRC_IDLE in NR in Release 15, the measurement possibly requested in the RRCSetup message are transmitted in a message right after security is activated, i.e. after the security mode command procedure.

An example realization of a modified measResultsthat can be included in the MeasurementReport message to report idle measurements is shown below:

- MeasurementReport

The MeasurementReport message is used for the indication of measurement results.
    Signalling radio bearer: SRB1, SRB3
    RLC-SAP: AM
    Logical channel: DCCH
    Direction: UE to Network MeasurementReport message

```
-- ASN1START
-- TAG-MEASUREMENTREPORT-START
MeasurementReport ::=                          SEQUENCE {
    criticalExtensions                         CHOICE {
        measurementReport                      MeasurementReport-IEs,
        criticalExtensionsFuture               SEQUENCE { }
    }
}
MeasurementReport-IEs ::=                      SEQUENCE {
    measResults                                MeasResults,
    lateNonCriticalExtension                   OCTET STRING
OPTIONAL,
    nonCriticalExtension                       SEQUENCE{ }
```

-continued

```
    OPTIONAL
}
-- TAG-MEASUREMENTREPORT-STOP
-- ASN1STOP
```

- MeasResults

The IE MeasResults covers measured results for intra-frequency, inter-frequency, and inter-RAT mobility.

MeasResults information element

```
-- ASN1START
-- TAG-MEAS-RESULTS-START
MeasResults ::=                     SEQUENCE {
    measId                          MeasId,
    measResultServingMOList
MeasResultServMOList,
    measResultNeighCells            CHOICE {
        measResultListNR
MeasResultListNR,
        ...,
        measResultListEUTRA
MeasResultListEUTRA,
        measResultListIdle-r16      MeasResultListIdle-r16
    }
OPTIONAL,
    ...
}
```

MeasResults field descriptions measId
Identifies the measurement identity for which the reporting is being performed. If measResultListIdle is included, any value can be assigned to the measId value, and it will be ignored by the network
measResultEUTRA
Measured results of an E-UTRA cell.
measResultListEUTRA
List of measured results for the maximum number of reported best cells for an E-UTRA measurement identity.
measResultListIdle
Idle mode measurement results
measResultListNR
List of measured results for the maximum number of reported best cells for an NR measurement identity.
measResultNR
Measured results of an NR cell.
measResultServingMOList
Measured results of measured cells with reference signals indicated in the serving cell measurement objects
including measurement results of SpCell, configured SCell(s) and best neighbouring cell within measured cells with reference signals indicated in on each serving cell measurement object. If measResultListIdle is included, this filed will be ignored by the network.

In one embodiment, the absolute time the idle mode measurement was taken is included in the measurement sent to the network (e.g., in the measResu/tListIdleIE that is included in the UE information response or the modified measResultthat is included in the MeasurementReport shown above).

Step 808 (Optional): The UE receives a reconfiguration from the network in an RRC Reconfiguration like message (e.g., RRCReconfiguration, RRCConnectionReconfiguration) to add, modify, remove, change state (activate/deactivate/etc.) SCGs, SCell(s), perform handovers, or any other action that may be assisted by early measurements) and applying the reconfiguration.

Figure 9:
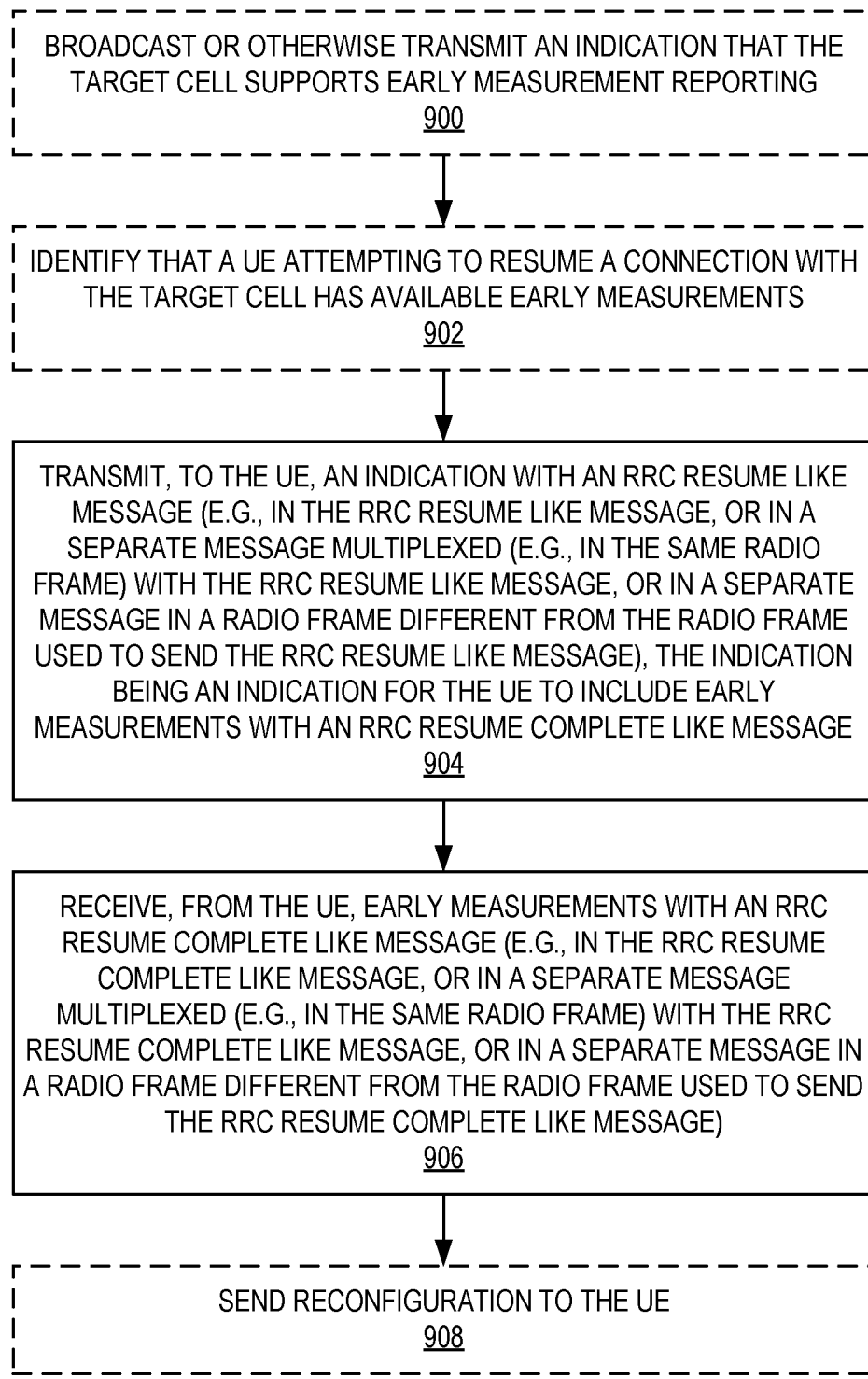
FIG. 9 illustrates a method performed by a network node in which early measurements (i.e., idle or dormant mode measurements) performed by a UE when in an idle/dormant state are reported to the network node with an RRC Resume-like message in accordance with some embodiments of the present disclosure.

In the present disclosure, embodiments of a method at a target network node (e.g., a target base station) associated to a target cell where a wireless terminal (e.g., UE) is trying to resume are provided. As illustrated in FIG. 9, in some embodiments, the method comprises the following steps. Note that while these actions are referred to as "steps", these actions may be performed in any suitable order and are not limited to the order in which they are presented here, unless otherwise stated or required. Further, optional steps are represented in FIG. 9 by dashed lines.

Step 900 (Optional): The network node broadcasts, or otherwise transmits, an indication that a target cell supports early measurements performed in a dormant state(s) (e.g., idle and/or inactive state) to be reported as described in the method.

Step 902 (Optional): The network node identifies that a UE trying to resume at that network node or an associated target cell has available measurements performed in a dormant state (e.g., RRC_IDLE or RRC_INACTIVE).

In one variant, the network node identifies that the UE has an available measurement performed in a dormant state by receiving (e.g., at the target cell) an RRC Resume Request like message (e.g., RRCResumeRequest) including an indication that the UE has available measurements performed in a dormant state (e.g., RRC_IDLE or RRC_INACTIVE). In the case of a RRC Resume Request, the RRC Resume Request message also includes, in some embodiments, an I-RNTI (UE AS context identifier), a security token (e.g., resume MAC-I), and/or a cause value.

In another variant, the network node identifies that the UE has an available measurement performed in a dormant state by receiving an RRC Resume Request like message (e.g., RRCResumeRequest) including an I-RNTI (UE AS context identifier), a security token (e.g., resume MAC-I), and a cause value and, after UE AS Context fetching, if the context is located in another source network node, identifying that the UE has been configured to perform idle/inactive measurements for early measurement reporting during transition to RRC_CONNECTED. Note that this variant may comprise the inclusion of this idle/inactive mode measurement configuration in the UE AS Context, which may also be exchanged between nodes during context fetching/pre-fetching, etc.

Step 904: The network nodes indicates, to the UE trying to resume a connection, that the UE is to include early measurements performed in a dormant state (e.g., idle/inactive state) in an RRC Resume Complete like message (e.g., with an RRCResumeComplete or RRCConnectionResumeComplete) or a separate message that is multiplexed with an RRC Resume Complete like message, if these are available. In one variant, the indication is provided with the RRC Resume like message (e.g., RRCResume or RRCConnectionResume). Thus, in some embodiments, the network node transmits, to the UE, an RRC Resume like message that includes the indication that the UE is to include early measurements performed in a dormant state in an RRC Resume Complete like message. In some other embodiments, the network node transmits, to the UE, a separate message that is multiplexed with an RRC Resume like message, where the separate message includes the indication that the UE is to include early measurements performed in a dormant state in an RRC Resume Complete like message.

Step 906: The network node receives measurements performed in dormant state (e.g., RRC_IDLE with AS Context, RRC_IDLE or RRC_INACTIVE) with an RRC Resume Complete like message (e.g., RRCResumeComplete or RRCConnectionResumeComplete). In some embodiments, the network node receives an RRC Resume Complete like message that includes the measurements. In some other embodiments, the network node receives a separate message that is multiplexed with the RRC Resume Complete like message, where the separate message includes the measurements. Based on the measurements, the network node decides to either keep the existing resumed UE configuration, add/remove/modify SCG configurations, add/remove/modify SCell configurations of the MCG and/or SCG.

Step 908 (Optional): The network node sends a reconfiguration to the UE the network in an RRC Reconfiguration like message (e.g., RRCReconfiguration, RRCConnectionReconfiguration) to add, modify, remove, change state (activate/deactivate/etc.) SCGs, SCell(s), perform handovers, or any other action that may be assisted by early measurements).

Figure 10:
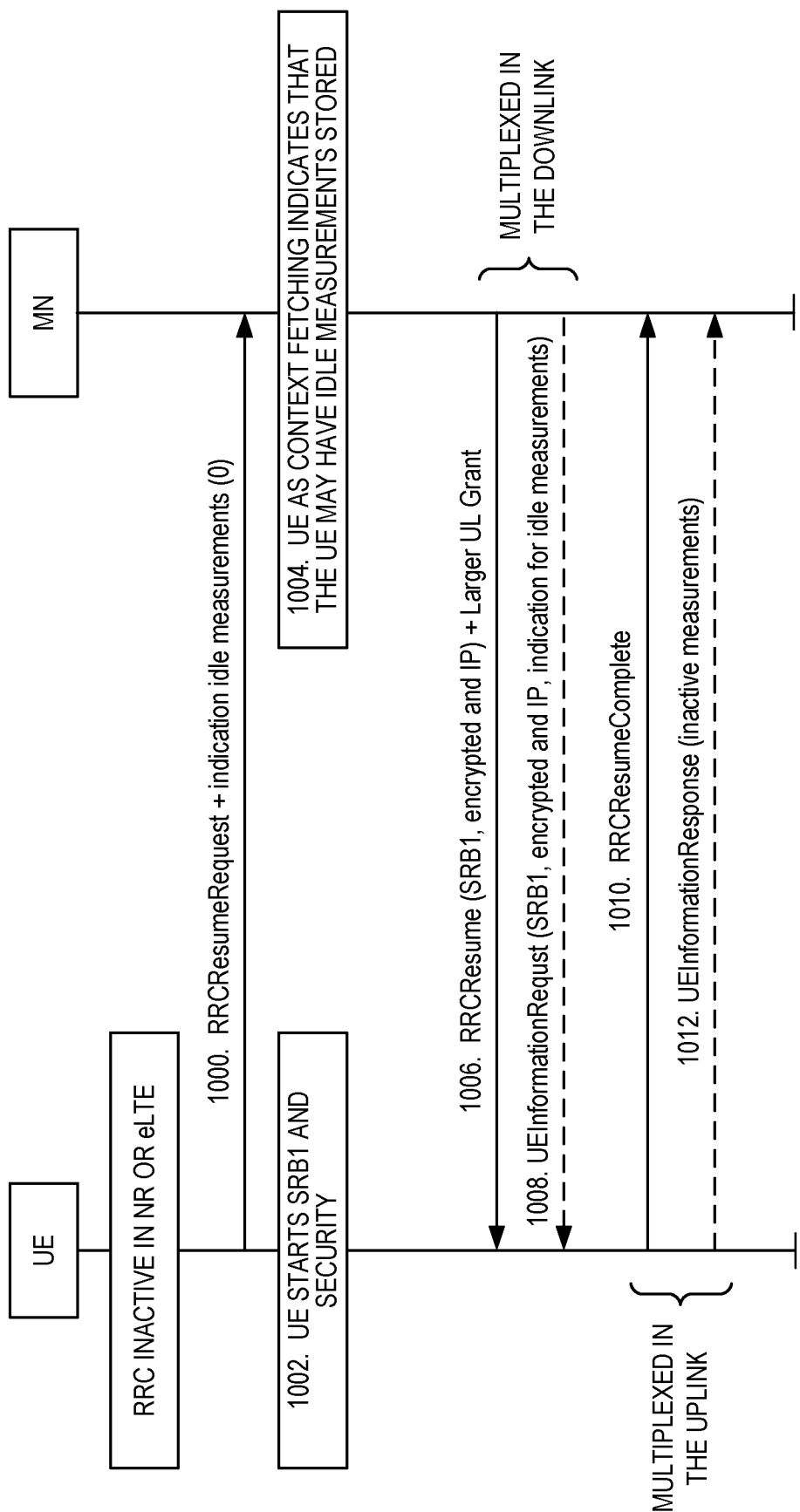
FIG. 10 illustrates the operation of a UE and a network node associated with a target cell of the UE in accordance with embodiments in which the indication that the UE is to include early measurements performed in a dormant state (e.g., idle/inactive state) with an RRC Resume Complete like message (e.g., with an RRCResumeComplete or RRCConnectionResumeComplete message) is provided in a separate message that is multiplexed with the RRCResume like message (e.g., an RRCResume message in this example) in accordance with some embodiments of the present disclosure.
Figure 11:
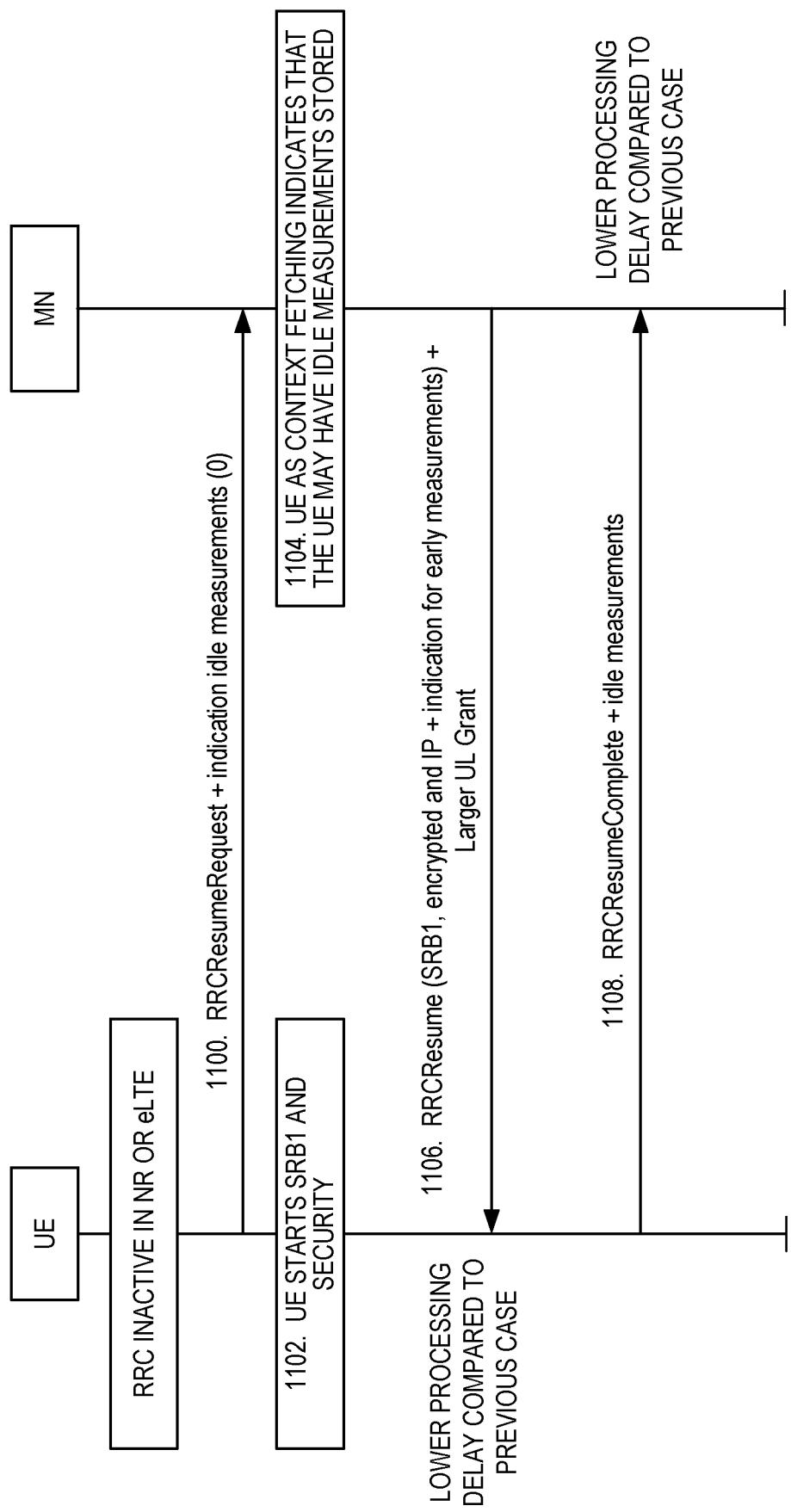
FIG. 11 illustrates the operation of a UE and a network node associated with a target cell of the UE in accordance with embodiments in which the indication that the UE is to include early measurements performed in a dormant state (e.g., idle/inactive state) with an RRC Resume Complete like message (e.g., with an RRCResumeComplete or RRCConnectionResumeComplete message) is provided in the RRCResume like message (e.g., an RRCResume message in this example) in accordance with some embodiments of the present disclosure.
Figure 12:
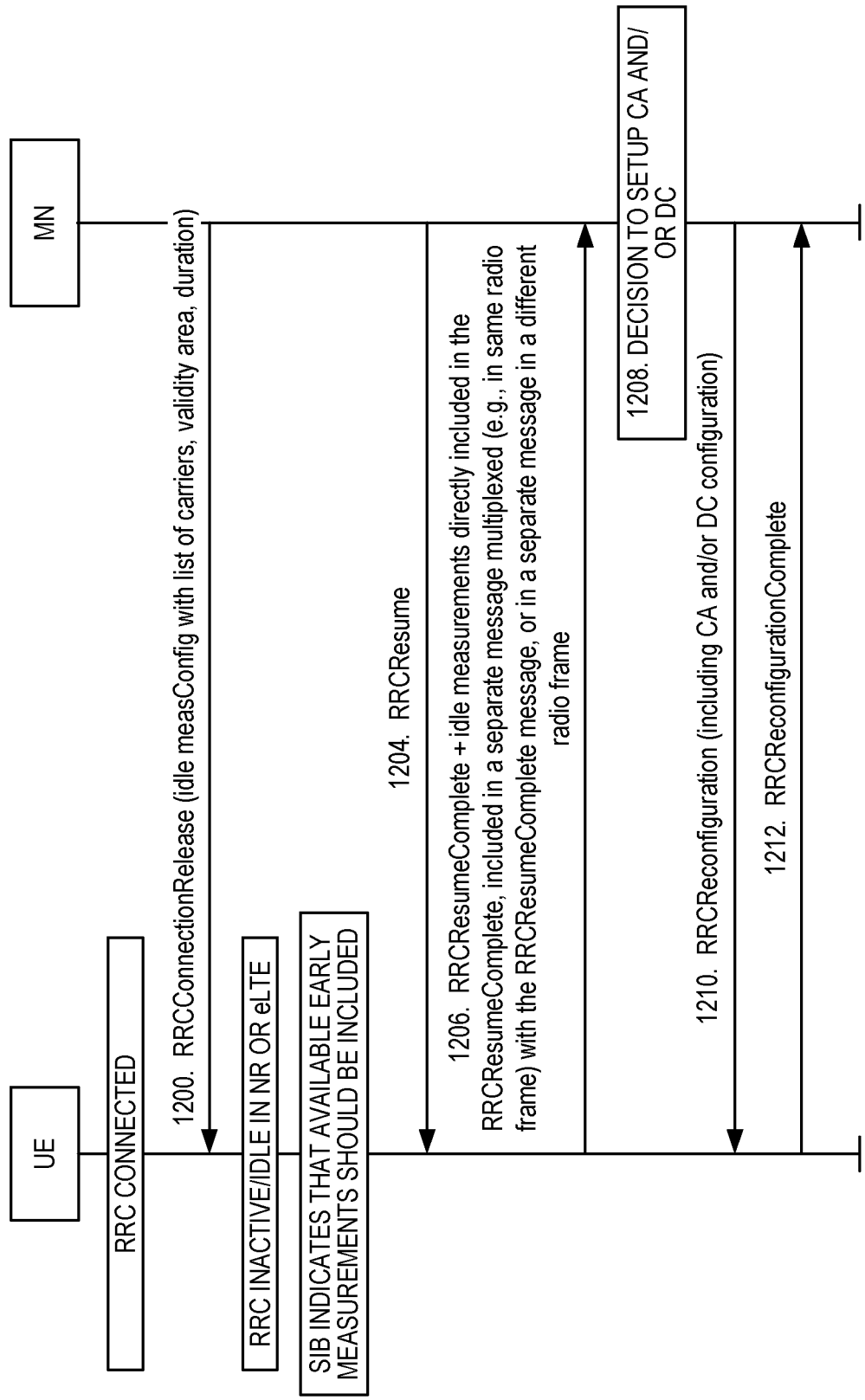
FIG. 12 illustrates another example call flow in which idle mode measurements are transmitted by the UE to the network node with the RRC Resume Complete like message in accordance with some embodiments of the present disclosure.

FIGS. 10, 11, and 12 show some signaling diagrams between the UE and the target network node that illustrate at least some of the embodiments described above.

In particular, FIG. 10 illustrates the operation of a UE and a network node associated with a target cell of the UE in accordance with embodiments in which the indication that the UE is to include early measurements performed in a dormant state (e.g., idle/inactive state) with an RRC Resume Complete like message (e.g., with an RRCResumeComplete or RRCConnectionResumeComplete) is provided in a separate message that is multiplexed with the RRCResume like message (e.g., an RRCResume message in this example) in accordance with some embodiments of the present disclosure. Similarly, the UE sends the measurements in a separate message that is multiplexed with the RRC Resume Complete like message (e.g., an RRCResumeComplete message in this example) in accordance with some embodiments of the present disclosure.

As illustrated in FIG. 10, the UE is in an RRC inactive state in NR or eLTE, in this example. The UE sends, to a network node associated with the target cell, an RRCResumeRequest (step 1000). The RRCResumeRequest optionally includes an indication that the UE has performed early measurements while in the RRC inactivate state. The UE starts SRB1 and security (step 1002). Optionally, the network node performs UE AS Context fetching, where this context indicates that the UE may have stored measurements that were performed by the UE while in RRC inactive state (or idle mode) (step 1004).

The network node transmits, to the UE, an RRCResume message and an optional separate message that is multiplexed with the RRCResume message (steps 1006 and 1008). The separate message includes an indication that the UE is to include early measurements performed in RRC inactive state with an RRC Resume Complete message (e.g., with an RRCResumeComplete or RRCConnectionResumeComplete). In this example, the UE transmits, to the network node, an RRCResumeComplete message and an optional separate message that is multiplexed with the RRCResumeComplete message (steps 1010 and 1012). The separate message includes the early measurements performed by the UE. The network node may then use these measurements, as described above.

The example embodiment of FIG. 10 provides an advantage in that there is no need to change existing messages in NR, i.e. similar design of RRCResume and RRCResumeComplete messages may be used. The solution requires the addition of the UEInformationRequest/Response messages. However, that would likely be needed anyway for other kind of Self-Organizing Network (SON) reports, e.g. Random Access Channel (RACH) report, Radio Link Failure (RLF) report, etc.

FIG. 11 illustrates the operation of a UE and a network node associated with a target cell of the UE in accordance with embodiments in which the indication that the UE is to include early measurements performed in a dormant state (e.g., idle/inactive state) with an RRC Resume Complete like message (e.g., with an RRCResumeComplete or RRCConnectionResumeComplete) is provided in the RRCResume like message (e.g., an RRCResume message in this example) in accordance with some embodiments of the present disclosure. Similarly, the UE sends the measurements in the RRC Resume Complete like message (e.g., an RRCResumeComplete message in this example) in accordance with some embodiments of the present disclosure.

As illustrated in FIG. 11, the UE is in an RRC inactive state in NR or eLTE, in this example. The UE sends, to a network node associated with the target cell, an RRCResumeRequest (step 1100). The RRCResumeRequest optionally includes an indication that the UE has performed early measurements while in the RRC inactivate state. The UE starts SRB1 and security (step 1102). Optionally, the network node performs UE AS Context fetching, where this context indicates that the UE may have stored measurements that were performed by the UE while in RRC inactive state (or idle mode) (step 1104).

The network node transmits, to the UE, an RRCResume message (step 1106). The RRCResume message includes an indication that the UE is to include early measurements performed in RRC inactive state with an RRC Resume Complete message (e.g., with an RRCResumeComplete or RRCConnectionResumeComplete). In this example, the UE transmits, to the network node, an RRCResumeComplete message (step 1108). The separate message includes the early measurements performed by the UE. The network node may then use these measurements, as described above.

The example embodiment of FIG. 11 provides an advantage compared to that of FIG. 10 (i.e., multiplexing of Resume messages with UE Information messages) in that lower processing delay at the UE and at the network reduces the latency to not only make these measurements available at the network but also processed correctly. Note that the measurements can be included directly in the RRCResumeComplete message or it could an RRC MeasurementReport message that contains the idle mode measurements multiplexed with the RRCResumeComplete message.

FIG. 12 illustrates another example call flow in which idle mode measurements are transmitted by the UE to the network node with the RRC Resume Complete like message in accordance with some embodiments of the present disclosure. As illustrated, initially, the UE is in RRC Connected state. A network node (e.g., a master node) transmits, to the UE, a RRC Connection Release message (step 1200). The RRC Connection Release message includes an idle mode measurement configuration that includes a list of carriers, a validity area, and a validity duration, in accordance with some embodiments of the present disclosure. The UE transitions to the RRC Inactive/Idle state. In this embodiment, a System Information Block (SIB) indicates that available early measurements should be included with the RRC Resume Complete message. Thus, sometime thereafter when the UE receives an RRCResume message from the network node (step 1204), the UE responds with an RRCResumeComplete message, where available idle mode measurements are directly included in the RRCResumeComplete message, included in a separate message (e.g., in a same radio frame) with the RRCResumeComplete message, or in a separate message in a different radio frame (step 1206). Based on the received measurements, the network node makes a decision to set up CA and/or DC for the UE (step 1208). The network node then sends an RRCReconfiguration message to the UE, where this message includes a CA and/or DC configuration for the UE (step 1210). The UE responds with an RRCReconfigurationComplete message (step 1212).

Figure 13:
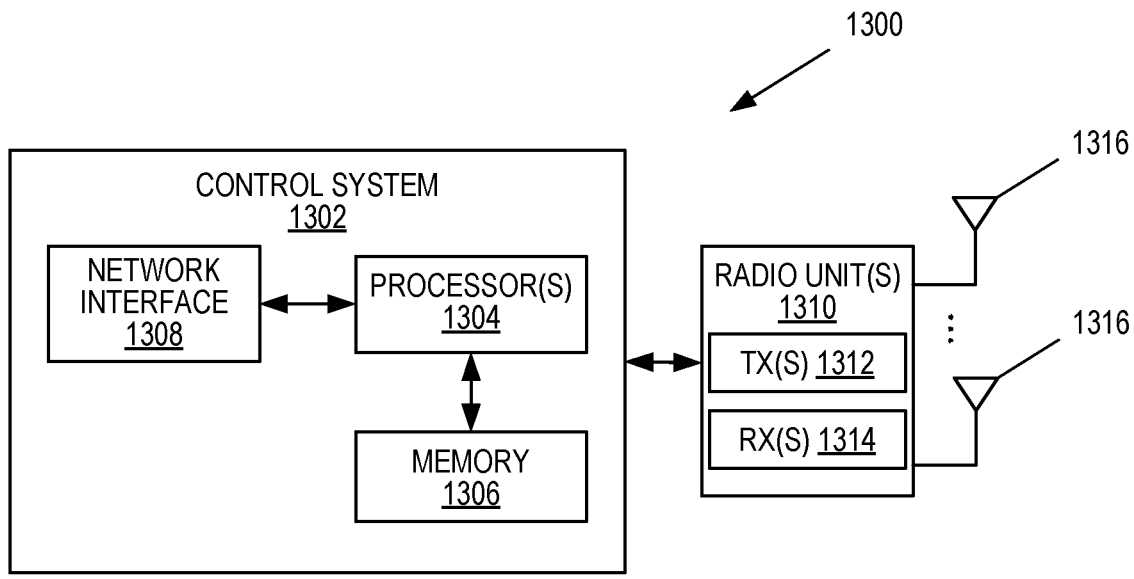
FIGS. 13 through 15 illustrate example embodiments of a radio access node.

FIG. 13 is a schematic block diagram of a radio access node 1300 according to some embodiments of the present disclosure. The radio access node 1300 may be, for example, a base station 702 or 706. As illustrated, the radio access node 1300 includes a control system 1302 that includes one or more processors 1304 (e.g., Central Processing Units (CPUs), Application Specific Integrated Circuits (ASICs), Field Programmable Gate Arrays (FPGAs), and/or the like), memory 1306, and a network interface 1308. The one or more processors 1304 are also referred to herein as processing circuitry. In addition, the radio access node 1300 includes one or more radio units 1310 that each includes one or more transmitters 1312 and one or more receivers 1314 coupled to one or more antennas 1316. The radio units 1310 may be referred to or be part of radio interface circuitry. In some embodiments, the radio unit(s) 1310 is external to the control system 1302 and connected to the control system 1302 via, e.g., a wired connection (e.g., an optical cable). However, in some other embodiments, the radio unit(s) 1310 and potentially the antenna(s) 1316 are integrated together with the control system 1302. The one or more processors 1304 operate to provide one or more functions of a radio access node 1300 as described herein (e.g., one or more functions of a network node or base station described above, e.g., with respect to FIGS. 9, 10, and/or 11). In some embodiments, the function(s) are implemented in software that is stored, e.g., in the memory 1306 and executed by the one or more processors 1304.

Figure 14:
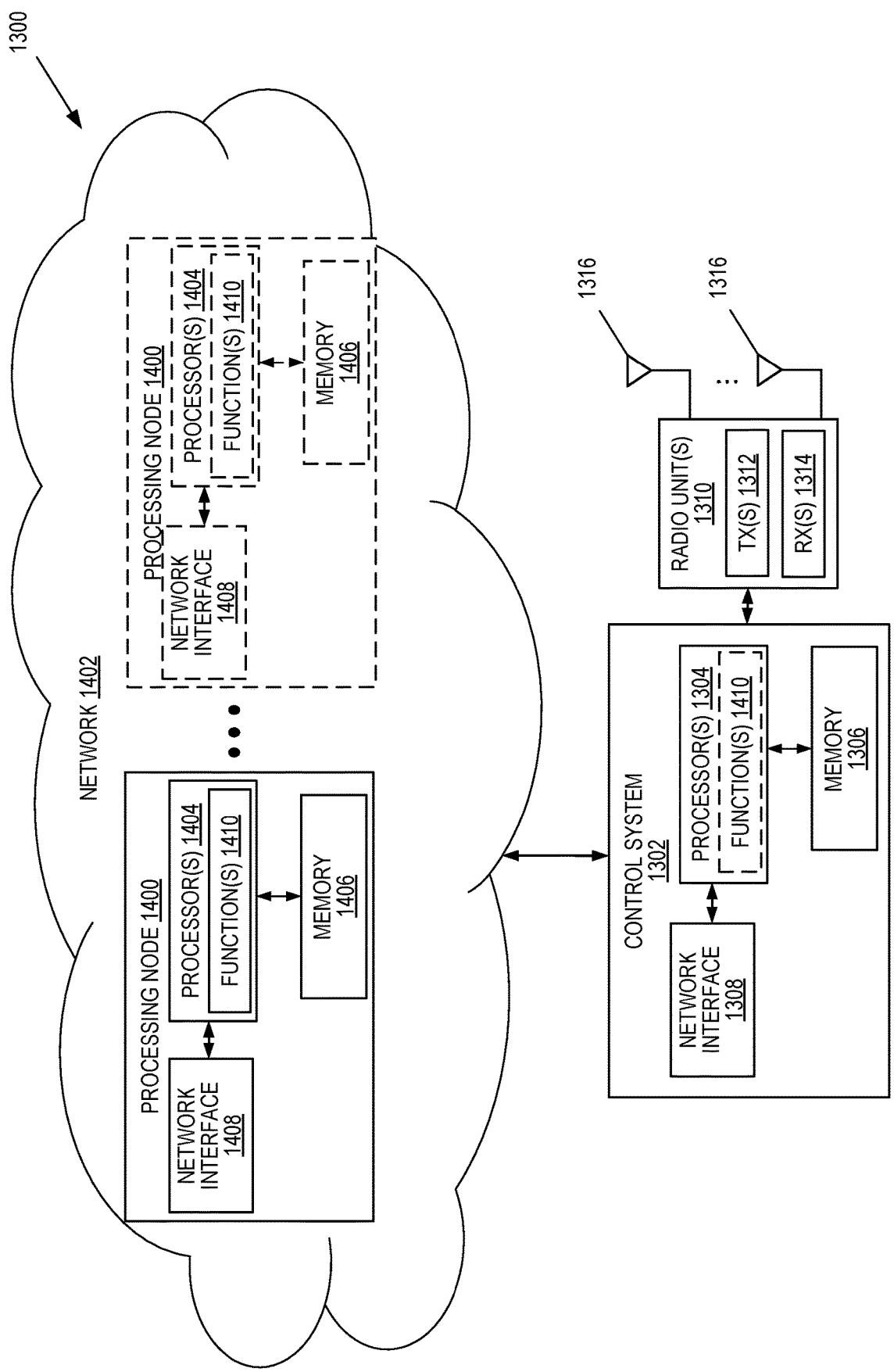

FIG. 14 is a schematic block diagram that illustrates a virtualized embodiment of the radio access node 1300 according to some embodiments of the present disclosure. This discussion is equally applicable to other types of network nodes. Further, other types of network nodes may have similar virtualized architectures.

As used herein, a "virtualized" radio access node is an implementation of the radio access node 1300 in which at least a portion of the functionality of the radio access node 1300 is implemented as a virtual component(s) (e.g., via a virtual machine(s) executing on a physical processing node(s) in a network(s)). As illustrated, in this example, the radio access node 1300 includes the control system 1302 that includes the one or more processors 1304 (e.g., CPUs, ASICs, FPGAs, and/or the like), the memory 1306, and the network interface 1308 and the one or more radio units 1310 that each includes the one or more transmitters 1312 and the one or more receivers 1314 coupled to the one or more antennas 1316, as described above. The control system 1302 is connected to the radio unit(s) 1310 via, for example, an optical cable or the like. The control system 1302 is connected to one or more processing nodes 1400 coupled to or included as part of a network(s) 1402 via the network interface 1308. Each processing node 1400 includes one or more processors 1404 (e.g., CPUs, ASICs, FPGAs, and/or the like), memory 1406, and a network interface 1408.

In this example, functions 1410 of the radio access node 1300 described herein (e.g., one or more functions of a network node or base station described above, e.g., with respect to FIGS. 9, 10, and/or 11) are implemented at the one or more processing nodes 1400 or distributed across the control system 1302 and the one or more processing nodes 1400 in any desired manner. In some particular embodiments, some or all of the functions 1410 of the radio access node 1300 described herein (e.g., one or more functions of a network node or base station described above, e.g., with respect to FIGS. 9, 10, and/or 11) are implemented as virtual components executed by one or more virtual machines implemented in a virtual environment(s) hosted by the processing node(s) 1400. As will be appreciated by one of ordinary skill in the art, additional signaling or communication between the processing node(s) 1400 and the control system 1302 is used in order to carry out at least some of the desired functions 1410. Notably, in some embodiments, the control system 1302 may not be included, in which case the radio unit(s) 1310 communicate directly with the processing node(s) 1400 via an appropriate network interface(s).

In some embodiments, a computer program including instructions which, when executed by at least one processor, causes the at least one processor to carry out the functionality of radio access node 1300 or a node (e.g., a processing node 1400) implementing one or more of the functions 1410 of the radio access node 1300 (e.g., one or more functions of a network node or base station described above, e.g., with respect to FIGS. 9, 10, and/or 11) in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 15:
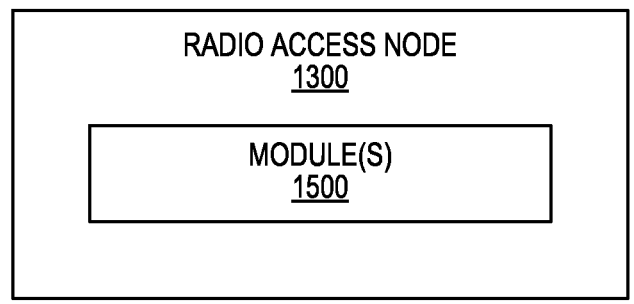

FIG. 15 is a schematic block diagram of the radio access node 1300 according to some other embodiments of the present disclosure. The radio access node 1300 includes one or more modules 1500, each of which is implemented in software. The module(s) 1500 provide the functionality of the radio access node 1300 described herein (e.g., one or more functions of a network node or base station described above, e.g., with respect to FIGS. 9, 10, and/or 11). This discussion is equally applicable to the processing node 1400 of FIG. 14 where the modules 1500 may be implemented at one of the processing nodes 1400 or distributed across multiple processing nodes 1400 and/or distributed across the processing node(s) 1400 and the control system 1302.

Figure 16:
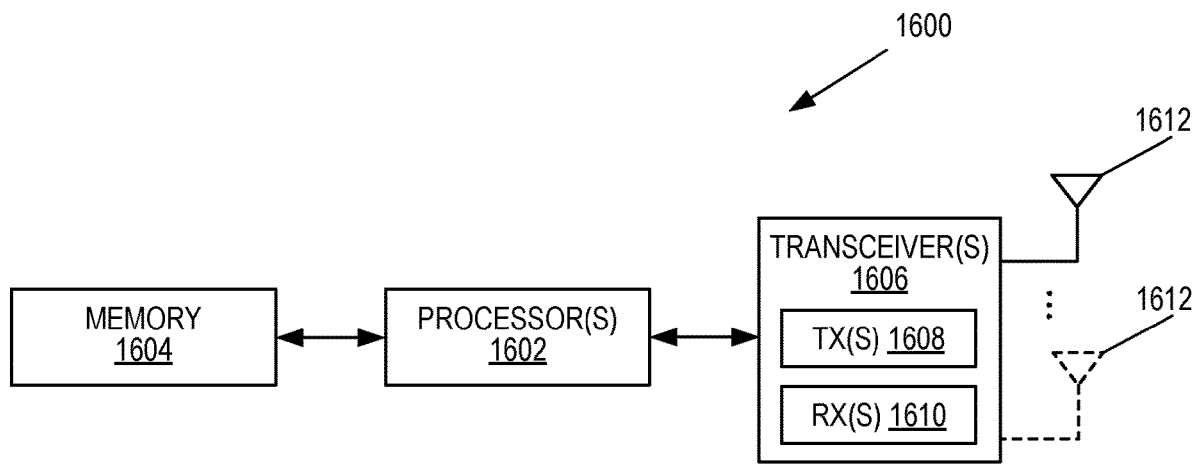
FIGS. 16 and 17 illustrate example embodiments of a UE.

FIG. 16 is a schematic block diagram of a UE 1600 according to some embodiments of the present disclosure. As illustrated, the UE 1600 includes one or more processors 1602 (e.g., CPUs, ASICs, FPGAs, and/or the like), memory 1604, and one or more transceivers 1606 each including one or more transmitters 1608 and one or more receivers 1610 coupled to one or more antennas 1612. The transceiver(s) 1606 includes radio-front end circuitry connected to the antenna(s) 1612 that is configured to condition signals communicated between the antenna(s) 1612 and the processor(s) 1602, as will be appreciated by on of ordinary skill in the art. The processors 1602 are also referred to herein as processing circuitry. The transceivers 1606 are also referred to herein as radio circuitry. In some embodiments, the functionality of the UE 1600 described above (e.g., one or more functions of a wireless device or UE described above, e.g., with respect to FIGS. 8, 10, and/or 11) may be fully or partially implemented in software that is, e.g., stored in the memory 1604 and executed by the processor(s) 1602. Note that the UE 1600 may include additional components not illustrated in FIG. 16 such as, e.g., one or more user interface components (e.g., an input/output interface including a display, buttons, a touch screen, a microphone, a speaker(s), and/or the like and/or any other components for allowing input of information into the UE 1600 and/or allowing output of information from the UE 1600), a power supply (e.g., a battery and associated power circuitry), etc.

In some embodiments, a computer program including instructions which, when executed by at least one processor, causes the at least one processor to carry out the functionality of the UE 1600 according to any of the embodiments described herein (e.g., one or more functions of a wireless device or UE described above, e.g., with respect to FIGS. 8, 10, and/or 11) is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 17:
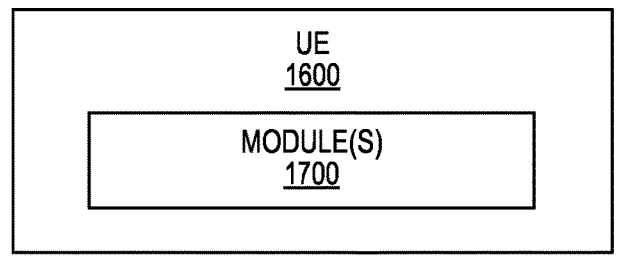

FIG. 17 is a schematic block diagram of the UE 1600 according to some other embodiments of the present disclosure. The UE 1600 includes one or more modules 1700, each of which is implemented in software. The module(s) 1700 provide the functionality of the UE 1600 described herein (e.g., one or more functions of a wireless device or UE described above, e.g., with respect to FIGS. 8, 10, and/or 11).

Figure 18:
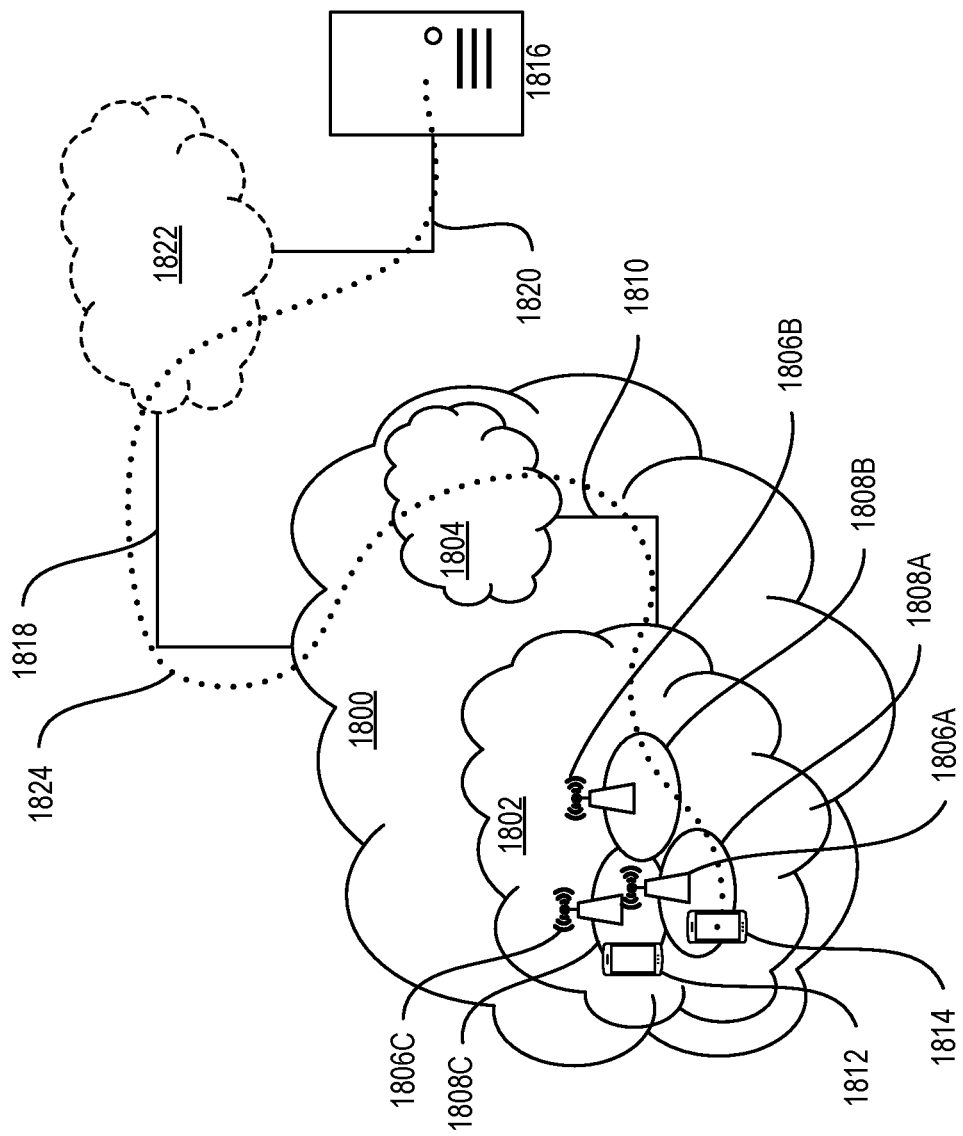
FIG. 18 illustrates an example communication system in which embodiments of the present disclosure may be implemented.

With reference to FIG. 18, in accordance with an embodiment, a communication system includes a telecommunication network 1800, such as a 3GPP-type cellular network, which comprises an access network 1802, such as a RAN, and a core network 1804. The access network 1802 comprises a plurality of base stations 1806A, 1806B, 1806C, such as Node Bs, eNBs, gNBs, or other types of wireless Access Points (APs), each defining a corresponding coverage area 1808A, 1808B, 1808C. Each base station 1806A, 1806B, 1806C is connectable to the core network 1804 over a wired or wireless connection 1810. A first UE 1812 located in coverage area 1808C is configured to wirelessly connect to, or be paged by, the corresponding base station 1806C. A second UE 1814 in coverage area 1808A is wirelessly connectable to the corresponding base station 1806A. While a plurality of UEs 1812, 1814 are illustrated in this example, the disclosed embodiments are equally applicable to a situation where a sole UE is in the coverage area or where a sole UE is connecting to the corresponding base station 1806.

The telecommunication network 1800 is itself connected to a host computer 1816, which may be embodied in the hardware and/or software of a standalone server, a cloud-implemented server, a distributed server, or as processing resources in a server farm. The host computer 1816 may be under the ownership or control of a service provider, or may be operated by the service provider or on behalf of the service provider. Connections 1818 and 1820 between the telecommunication network 1800 and the host computer 1816 may extend directly from the core network 1804 to the host computer 1816 or may go via an optional intermediate network 1822. The intermediate network 1822 may be one of, or a combination of more than one of, a public, private, or hosted network; the intermediate network 1822, if any, may be a backbone network or the Internet; in particular, the intermediate network 1822 may comprise two or more sub-networks (not shown).

The communication system of FIG. 18 as a whole enables connectivity between the connected UEs 1812, 1814 and the host computer 1816. The connectivity may be described as an Over-the-Top (OTT) connection 1824. The host computer 1816 and the connected UEs 1812, 1814 are configured to communicate data and/or signaling via the OTT connection 1824, using the access network 1802, the core network 1804, any intermediate network 1822, and possible further infrastructure (not shown) as intermediaries. The OTT connection 1824 may be transparent in the sense that the participating communication devices through which the OTT connection 1824 passes are unaware of routing of uplink and downlink communications. For example, the base station 1806 may not or need not be informed about the past routing of an incoming downlink communication with data originating from the host computer 1816 to be forwarded (e.g., handed over) to a connected UE 1812. Similarly, the base station 1806 need not be aware of the future routing of an outgoing uplink communication originating from the UE 1812 towards the host computer 1816.

Example implementations, in accordance with an embodiment, of the UE, base station, and host computer discussed in the preceding paragraphs will now be described with reference to FIG. 19. In a communication system 1900, a host computer 1902 comprises hardware 1904 including a communication interface 1906 configured to set up and maintain a wired or wireless connection with an interface of a different communication device of the communication system 1900. The host computer 1902 further comprises processing circuitry 1908, which may have storage and/or processing capabilities. In particular, the processing circuitry 1908 may comprise one or more programmable processors, ASICs, FPGAs, or combinations of these (not shown) adapted to execute instructions. The host computer 1902 further comprises software 1910, which is stored in or accessible by the host computer 1902 and executable by the processing circuitry 1908. The software 1910 includes a host application 1912. The host application 1912 may be operable to provide a service to a remote user, such as a UE 1914 connecting via an OTT connection 1916 terminating at the UE 1914 and the host computer 1902. In providing the service to the remote user, the host application 1912 may provide user data which is transmitted using the OTT connection 1916.

The communication system 1900 further includes a base station 1918 provided in a telecommunication system and comprising hardware 1920 enabling it to communicate with the host computer 1902 and with the UE 1914. The hardware 1920 may include a communication interface 1922 for setting up and maintaining a wired or wireless connection with an interface of a different communication device of the communication system 1900, as well as a radio interface 1924 for setting up and maintaining at least a wireless connection 1926 with the UE 1914 located in a coverage area (not shown in FIG. 19) served by the base station 1918. The communication interface 1922 may be configured to facilitate a connection 1928 to the host computer 1902. The connection 1928 may be direct or it may pass through a core network (not shown in FIG. 19) of the telecommunication system and/or through one or more intermediate networks outside the telecommunication system. In the embodiment shown, the hardware 1920 of the base station 1918 further includes processing circuitry 1930, which may comprise one or more programmable processors, ASICs, FPGAs, or combinations of these (not shown) adapted to execute instructions. The base station 1918 further has software 1932 stored internally or accessible via an external connection.

The communication system 1900 further includes the UE 1914 already referred to. The UE's 1914 hardware 1934 may include a radio interface 1936 configured to set up and maintain a wireless connection 1926 with a base station serving a coverage area in which the UE 1914 is currently located. The hardware 1934 of the UE 1914 further includes processing circuitry 1938, which may comprise one or more programmable processors, ASICs, FPGAs, or combinations of these (not shown) adapted to execute instructions. The UE 1914 further comprises software 1940, which is stored in or accessible by the UE 1914 and executable by the processing circuitry 1938. The software 1940 includes a client application 1942. The client application 1942 may be operable to provide a service to a human or non-human user via the UE 1914, with the support of the host computer 1902. In the host computer 1902, the executing host application 1912 may communicate with the executing client application 1942 via the OTT connection 1916 terminating at the UE 1914 and the host computer 1902. In providing the service to the user, the client application 1942 may receive request data from the host application 1912 and provide user data in response to the request data. The OTT connection 1916 may transfer both the request data and the user data. The client application 1942 may interact with the user to generate the user data that it provides.

Figure 19:
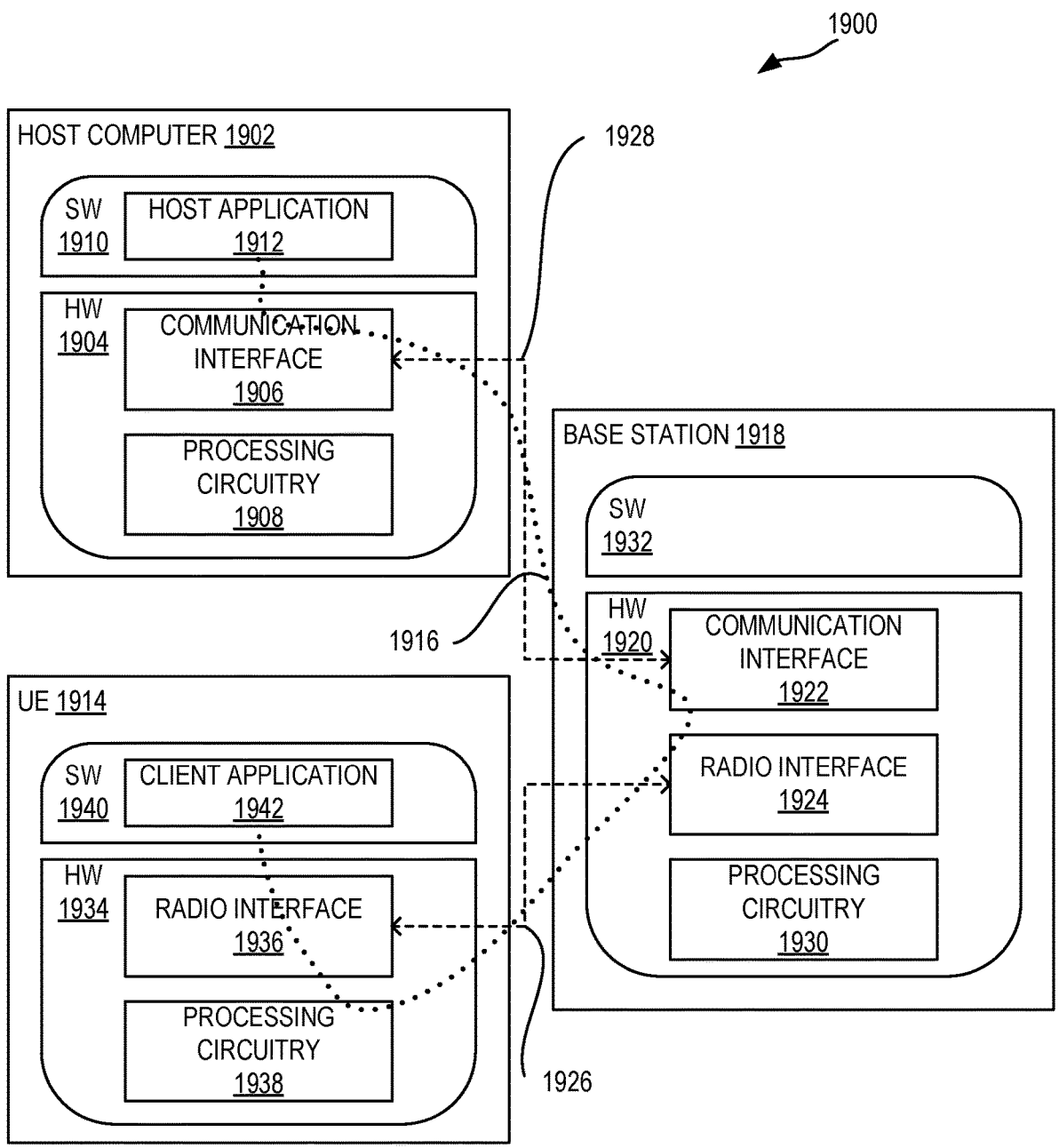
FIG. 19 illustrates example embodiments of a UE, base station, and host computer in the communication system of FIG. 18.

It is noted that the host computer 1902, the base station 1918, and the UE 1914 illustrated in FIG. 19 may be similar or identical to the host computer 1816, one of the base stations 1806A, 1806B, 1806C, and one of the UEs 1812, 1814 of FIG. 18, respectively. This is to say, the inner workings of these entities may be as shown in FIG. 19 and independently, the surrounding network topology may be that of FIG. 18.

In FIG. 19, the OTT connection 1916 has been drawn abstractly to illustrate the communication between the host computer 1902 and the UE 1914 via the base station 1918 without explicit reference to any intermediary devices and the precise routing of messages via these devices. The network infrastructure may determine the routing, which may be configured to hide from the UE 1914 or from the service provider operating the host computer 1902, or both. While the OTT connection 1916 is active, the network infrastructure may further take decisions by which it dynamically changes the routing (e.g., on the basis of load balancing consideration or reconfiguration of the network).

The wireless connection 1926 between the UE 1914 and the base station 1918 is in accordance with the teachings of the embodiments described throughout this disclosure. One or more of the various embodiments improve the performance of OTT services provided to the UE 1914 using the OTT connection 1916, in which the wireless connection 1926 forms the last segment. More precisely, the teachings of these embodiments may improve e.g., data rate, latency, and/or power consumption and thereby provide benefits such as, e.g., reduced user waiting time, relaxed restriction on file size, better responsiveness, and/or extended battery lifetime.

A measurement procedure may be provided for the purpose of monitoring data rate, latency, and other factors on which the one or more embodiments improve. There may further be an optional network functionality for reconfiguring the OTT connection 1916 between the host computer 1902 and the UE 1914, in response to variations in the measurement results. The measurement procedure and/or the network functionality for reconfiguring the OTT connection 1916 may be implemented in the software 1910 and the hardware 1904 of the host computer 1902 or in the software 1940 and the hardware 1934 of the UE 1914, or both. In some embodiments, sensors (not shown) may be deployed in or in association with communication devices through which the OTT connection 1916 passes; the sensors may participate in the measurement procedure by supplying values of the monitored quantities exemplified above, or supplying values of other physical quantities from which the software 1910, 1940 may compute or estimate the monitored quantities. The reconfiguring of the OTT connection 1916 may include message format, retransmission settings, preferred routing, etc.; the reconfiguring need not affect the base station 1918, and it may be unknown or imperceptible to the base station 1918. Such procedures and functionalities may be known and practiced in the art. In certain embodiments, measurements may involve proprietary UE signaling facilitating the host computer 1902's measurements of throughput, propagation times, latency, and the like. The measurements may be implemented in that the software 1910 and 1940 causes messages to be transmitted, in particular empty or 'dummy' messages, using the OTT connection 1916 while it monitors propagation times, errors, etc.

FIG. 20 is a flowchart illustrating a method implemented in a communication system, in accordance with one embodiment. The communication system includes a host computer, a base station, and a UE which may be those described with reference to FIGS. 18 and 19. For simplicity of the present disclosure, only drawing references to FIG. 20 will be included in this section. In step 2000, the host computer provides user data. In sub-step 2002 (which may be optional) of step 2000, the host computer provides the user data by executing a host application. In step 2004, the host computer initiates a transmission carrying the user data to the UE. In step 2006 (which may be optional), the base station transmits to the UE the user data which was carried in the transmission that the host computer initiated, in accordance with the teachings of the embodiments described throughout this disclosure. In step 2008 (which may also be optional), the UE executes a client application associated with the host application executed by the host computer.

FIG. 21 is a flowchart illustrating a method implemented in a communication system, in accordance with one embodiment. The communication system includes a host computer, a base station, and a UE which may be those described with reference to FIGS. 18 and 19. For simplicity of the present disclosure, only drawing references to FIG. 21 will be included in this section. In step 2100 of the method, the host computer provides user data. In an optional sub-step (not shown) the host computer provides the user data by executing a host application. In step 2102, the host computer initiates a transmission carrying the user data to the UE. The transmission may pass via the base station, in accordance with the teachings of the embodiments described throughout this disclosure. In step 2104 (which may be optional), the UE receives the user data carried in the transmission.

Figures 22, 23:
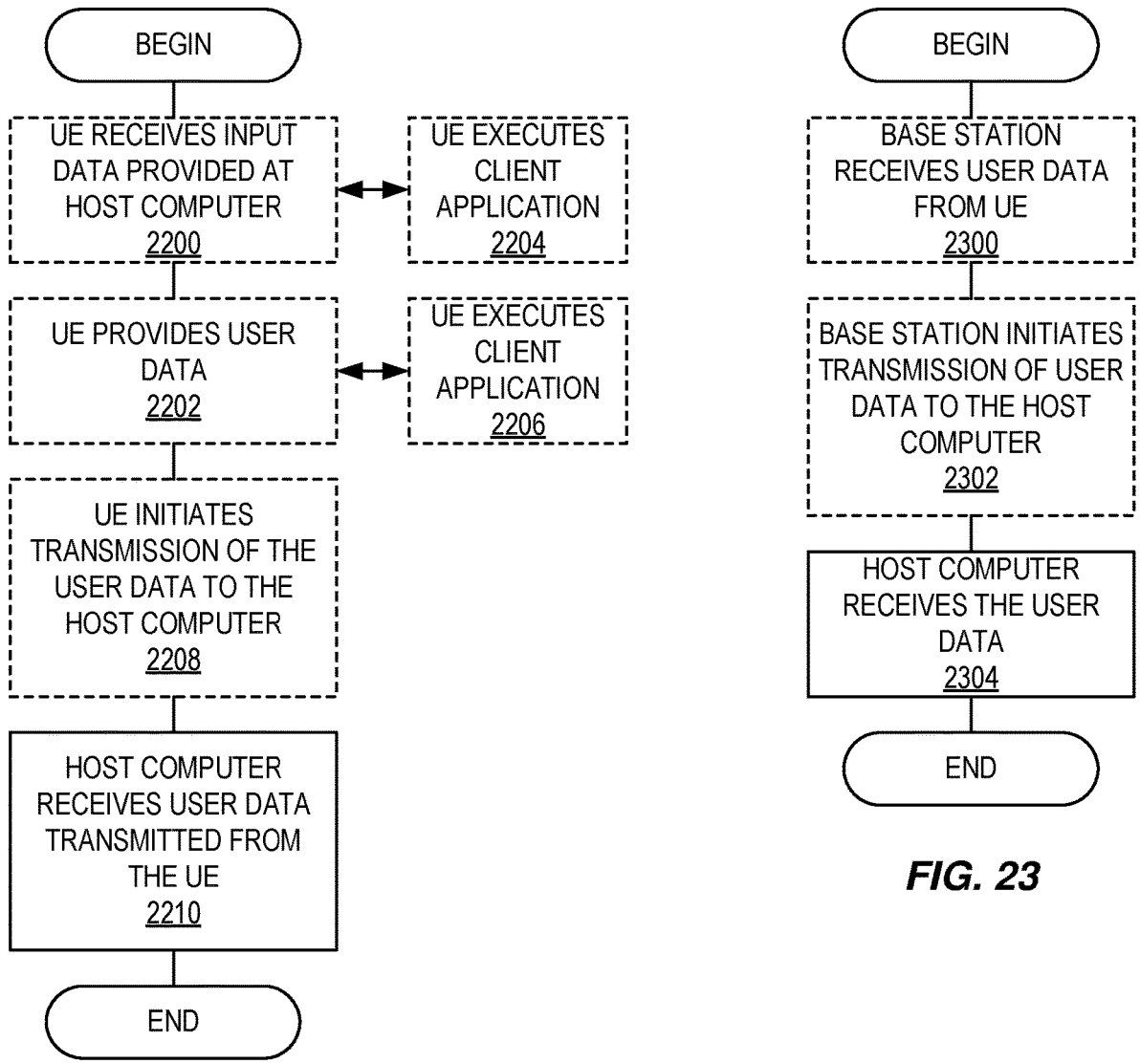

FIG. 22 is a flowchart illustrating a method implemented in a communication system, in accordance with one embodiment. The communication system includes a host computer, a base station, and a UE which may be those described with reference to FIGS. 18 and 19. For simplicity of the present disclosure, only drawing references to FIG. 22 will be included in this section. In step 2200 (which may be optional), the UE receives input data provided by the host computer. Additionally or alternatively, in step 2202, the UE provides user data. In sub-step 2204 (which may be optional) of step 2200, the UE provides the user data by executing a client application. In sub-step 2206 (which may be optional) of step 2202, the UE executes a client application which provides the user data in reaction to the received input data provided by the host computer. In providing the user data, the executed client application may further consider user input received from the user. Regardless of the specific manner in which the user data was provided, the UE initiates, in sub-step 2208 (which may be optional), transmission of the user data to the host computer. In step 2210 of the method, the host computer receives the user data transmitted from the UE, in accordance with the teachings of the embodiments described throughout this disclosure.

FIG. 23 is a flowchart illustrating a method implemented in a communication system, in accordance with one embodiment. The communication system includes a host computer, a base station, and a UE which may be those described with reference to FIGS. 18 and 19. For simplicity of the present disclosure, only drawing references to FIG. 23 will be included in this section. In step 2300 (which may be optional), in accordance with the teachings of the embodiments described throughout this disclosure, the base station receives user data from the UE. In step 2302 (which may be optional), the base station initiates transmission of the received user data to the host computer. In step 2304 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

Some example embodiments of the present disclosure are as follows:

Group A Embodiments

Embodiment 1: A method performed by a wireless device, the method comprising: receiving (804, 1008, 1106), from a network node, an indication with a first message (e.g., a Radio Resource Control, RRC, Resume like message) to resume a connection (e.g., an RRC connection) with a target cell, the indication being an indication that the wireless device is to include measurements performed by the wireless device while in a dormant state with a second message (e.g., an RRC Resume Complete like message) that indicates that resuming of the connection with the target cell is complete; and transmitting (806, 1012, 1108), to the network node, the measurements performed by the wireless device while in the dormant state with the second message.

Embodiment 2: The method of embodiment 1 wherein receiving (804, 1008, 1106) the indication with the first message comprises receiving (804, 1008) a separate message that is multiplexed with the first message, the separate message comprising the indication.

Embodiment 3: The method of embodiment 1 wherein receiving (804, 1008, 1106) the indication with the first message comprises receiving (804, 1106) the first message, the first message comprising the indication.

Embodiment 4: The method of any one of embodiments 1 to 3 wherein transmitting (806, 1012, 1108) the measurements comprises transmitting (806, 1012) a separate message that is multiplexed with the second message, the separate message comprising the measurements.

Embodiment 5: The method of any one of embodiments 1 to 3 wherein transmitting (806, 1012, 1108) the measurements comprises transmitting (806, 1108) the second message, the second message comprising the measurements.

Embodiment 6: The method of any one of embodiments 1 to 5 wherein the first message is an RRC Resume message, and the second message is an RRC Resume Complete message.

Embodiment 7: The method of any one of embodiments 1 to 6 further comprising, prior to receiving (804, 1008, 1106) the indication, transmitting (802, 1000, 1100) a request to resume the connection with the target cell, the request comprising an indication that the wireless device has measurements performed by the wireless device while in the dormant state.

Embodiment 8: The method of any one of embodiments 1 to 7 further comprising, prior to receiving (804, 1008, 1106) the indication, identifying (800) that the target cell supports reporting of early measurements.

Embodiment 9: The method of any of the previous embodiments, further comprising: providing user data; and forwarding the user data to a host computer via the transmission to the network node.

Group B Embodiments

Embodiment 10: A method performed by a base station, the method comprising: transmitting (904, 1008, 1106), to a wireless device that is attempting to resume a connection with an associated target cell, an indication with a first message (e.g., a Radio Resource Control, RRC, Resume like message) to resume the connection (e.g., an RRC connection) with the target cell, the indication being an indication that the wireless device is to include measurements performed by the wireless device while in a dormant state with a second message (e.g., an RRC Resume Complete like message) that indicates that resuming of the connection with the target cell is complete; and receiving (906, 1012, 1108), from the wireless device, the measurements performed by the wireless device while in the dormant state with the second message.

Embodiment 11: The method of embodiment 10 wherein transmitting (904, 1008, 1106) the indication with the first message comprises transmitting (904, 1008) a separate message that is multiplexed with the first message, the separate message comprising the indication.

Embodiment 12: The method of embodiment 10 wherein transmitting (904, 1008, 1106) the indication with the first message comprises transmitting (904, 1106) the first message, the first message comprising the indication.

Embodiment 13: The method of any one of embodiments 10 to 12 wherein receiving (906, 1012, 1108) the measurements comprises receiving (906, 1012) a separate message that is multiplexed with the second message, the separate message comprising the measurements.

Embodiment 14: The method of any one of embodiments 10 to 12 wherein receiving (906, 1012, 1108) the measurements comprises receiving (906, 1108) the second message, the second message comprising the measurements.

Embodiment 15: The method of any one of embodiments 10 to 14 wherein the first message is an RRC Resume message, and the second message is an RRC Resume Complete message.

Embodiment 16: The method of any one of embodiments 1 to 15 further comprising, prior to transmitting (904, 1008, 1106) the indication, identifying (902, 1000, 1100) that the wireless device has measurements performed by the wireless device while in the dormant state.

Embodiment 17: The method of embodiment 16 wherein identifying (902, 1000, 1100) that the wireless device has measurements performed by the wireless device while in the dormant state comprises receiving (1000, 1100), from the wireless device, a request to resume the connection with the target cell, the request comprising an indication that the wireless device has measurements performed by the wireless device while in the dormant state.

Embodiment 18: The method of embodiment 16 wherein identifying (902, 1000, 1100) that the wireless device has measurements performed by the wireless device while in the dormant state comprises obtaining (1002, 1102) an Access Stratum, AS, Context of the wireless device and determining (1002, 1102) that the wireless device has measurements performed by the wireless device while in the dormant state based on the AS Context of the wireless device.

Embodiment 19: The method of any one of embodiments 10 to 18 further comprising, prior to transmitting (904, 1008, 1106) the indication, broadcasting or otherwise transmitting (900) an indication that the target cell supports reporting of early measurements.

Embodiment 20: The method of any of the previous embodiments, further comprising: obtaining user data; and forwarding the user data to a host computer or a wireless device.

Group C Embodiments

Embodiment 21: A wireless device, the wireless device comprising: processing circuitry configured to perform any of the steps of any of the Group A embodiments; and power supply circuitry configured to supply power to the wireless device.

Embodiment 22: A base station, the base station comprising: processing circuitry configured to perform any of the steps of any of the Group B embodiments; and power supply circuitry configured to supply power to the base station.

Embodiment 23: A User Equipment, UE, comprising: an antenna configured to send and receive wireless signals; radio front-end circuitry connected to the antenna and to processing circuitry, and configured to condition signals communicated between the antenna and the processing circuitry; the processing circuitry being configured to perform any of the steps of any of the Group A embodiments; an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE.

Embodiment 24: A communication system including a host computer comprising: processing circuitry configured to provide user data; and a communication interface configured to forward the user data to a cellular network for transmission to a User Equipment, UE; wherein the cellular network comprises a base station having a radio interface and processing circuitry, the base station's processing circuitry configured to perform any of the steps of any of the Group B embodiments.

Embodiment 25: The communication system of the previous embodiment further including the base station.

Embodiment 26: The communication system of the previous 2 embodiments, further including the UE, wherein the UE is configured to communicate with the base station.

Embodiment 27: The communication system of the previous 3 embodiments, wherein: the processing circuitry of the host computer is configured to execute a host application, thereby providing the user data; and the UE comprises processing circuitry configured to execute a client application associated with the host application.

Embodiment 28: A method implemented in a communication system including a host computer, a base station, and a User Equipment, UE, the method comprising: at the host computer, providing user data; and at the host computer, initiating a transmission carrying the user data to the UE via a cellular network comprising the base station, wherein the base station performs any of the steps of any of the Group B embodiments.

Embodiment 29: The method of the previous embodiment, further comprising, at the base station, transmitting the user data.

Embodiment 30: The method of the previous 2 embodiments, wherein the user data is provided at the host computer by executing a host application, the method further comprising, at the UE, executing a client application associated with the host application.

Embodiment 31: A User Equipment, UE, configured to communicate with a base station, the UE comprising a radio interface and processing circuitry configured to perform the method of the previous 3 embodiments.

Embodiment 32: A communication system including a host computer comprising: processing circuitry configured to provide user data; and a communication interface configured to forward user data to a cellular network for transmission to a User Equipment, UE; wherein the UE comprises a radio interface and processing circuitry, the UE's components configured to perform any of the steps of any of the Group A embodiments.

Embodiment 33: The communication system of the previous embodiment, wherein the cellular network further includes a base station configured to communicate with the UE.

Embodiment 34: The communication system of the previous 2 embodiments, wherein: the processing circuitry of the host computer is configured to execute a host application, thereby providing the user data; and the UE's processing circuitry is configured to execute a client application associated with the host application.

Embodiment 35: A method implemented in a communication system including a host computer, a base station, and a User Equipment, UE, the method comprising: at the host computer, providing user data; and at the host computer, initiating a transmission carrying the user data to the UE via a cellular network comprising the base station, wherein the UE performs any of the steps of any of the Group A embodiments.

Embodiment 36: The method of the previous embodiment, further comprising at the UE, receiving the user data from the base station.

Embodiment 37: A communication system including a host computer comprising: communication interface configured to receive user data originating from a transmission from a User Equipment, UE, to a base station; wherein the UE comprises a radio interface and processing circuitry, the UE's processing circuitry configured to perform any of the steps of any of the Group A embodiments.

Embodiment 38: The communication system of the previous embodiment, further including the UE.

Embodiment 39: The communication system of the previous 2 embodiments, further including the base station, wherein the base station comprises a radio interface configured to communicate with the UE and a communication interface configured to forward to the host computer the user data carried by a transmission from the UE to the base station.

Embodiment 40: The communication system of the previous 3 embodiments, wherein: the processing circuitry of the host computer is configured to execute a host application; and the UE's processing circuitry is configured to execute a client application associated with the host application, thereby providing the user data.

Embodiment 41: The communication system of the previous 4 embodiments, wherein: the processing circuitry of the host computer is configured to execute a host application, thereby providing request data; and the UE's processing circuitry is configured to execute a client application associated with the host application, thereby providing the user data in response to the request data.

Embodiment 42: A method implemented in a communication system including a host computer, a base station, and a User Equipment, UE, the method comprising: at the host computer, receiving user data transmitted to the base station from the UE, wherein the UE performs any of the steps of any of the Group A embodiments.

Embodiment 43: The method of the previous embodiment, further comprising, at the UE, providing the user data to the base station.

Embodiment 44: The method of the previous 2 embodiments, further comprising: at the UE, executing a client application, thereby providing the user data to be transmitted; and at the host computer, executing a host application associated with the client application.

Embodiment 45: The method of the previous 3 embodiments, further comprising: at the UE, executing a client application; and at the UE, receiving input data to the client application, the input data being provided at the host computer by executing a host application associated with the client application; wherein the user data to be transmitted is provided by the client application in response to the input data.

Embodiment 46: A communication system including a host computer comprising a communication interface configured to receive user data originating from a transmission from a User Equipment, UE, to a base station, wherein the base station comprises a radio interface and processing circuitry, the base station's processing circuitry configured to perform any of the steps of any of the Group B embodiments.

Embodiment 47: The communication system of the previous embodiment further including the base station.

Embodiment 48: The communication system of the previous 2 embodiments, further including the UE, wherein the UE is configured to communicate with the base station.

Embodiment 49: The communication system of the previous 3 embodiments, wherein: the processing circuitry of the host computer is configured to execute a host application; and the UE is configured to execute a client application associated with the host application, thereby providing the user data to be received by the host computer.

Embodiment 50: A method implemented in a communication system including a host computer, a base station, and a User Equipment, UE, the method comprising: at the host computer, receiving, from the base station, user data originating from a transmission which the base station has received from the UE, wherein the UE performs any of the steps of any of the Group A embodiments.

Embodiment 51: The method of the previous embodiment, further comprising at the base station, receiving the user data from the UE.

Embodiment 52: The method of the previous 2 embodiments, further comprising at the base station, initiating a transmission of the received user data to the host computer.

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
5G Fifth Generation
5GC Fifth Generation Core
5GS Fifth Generation System
AP Access Point AS Access Stratum
ASIC Application Specific Integrated Circuit
CA Carrier Aggregation
CE Control Element
CPU Central Processing Unit
DC Dual Connectivity
DRB Data Radio Bearer
DSP Digital Signal Processor
eLTE Enhanced Long Term Evolution
eNB Enhanced or Evolved Node B
EN-DC Evolved Universal Terrestrial Radio Access Network New Radio Dual Connectivity
EPC Evolved Packet Core
E-UTRA Evolved Universal Terrestrial Radio Access
E-UTRAN Evolved Universal Terrestrial Radio Access Network
FPGA Field Programmable Gate Array
gNB New Radio Base Station
ID Identity
IE Information Element
I-RNTI Inactive Radio Network Temporary Identifier
LTE Long Term Evolution
MAC Medium Access Control
MAC-I Message Authentication Code for Integrity
MCG Master Cell Group
MeNB Master Enhanced or Evolved Node B
MME Mobility Management Entity
MR-DC Multi-Radio Dual Connectivity
ms Millisecond
MTC Machine Type Communication
NCC Next-hop Chaining Count
NE New Radio Evolved Universal Terrestrial Radio Access
NGEN-DC Next Generation EN-DC
NG-RAN Next Generation Radio Access Network
NR New Radio
OTT Over-the-Top
PCell Primary Cell
PCI Physical Cell Identity
P-GW Packet Data Network Gateway
PSCell Primary Secondary Cell
RACH Random Access Channel
RAM Random Access Memory
RAN Radio Access Network
RAT Radio Access Technology
RLF Radio Link Failure
ROM Read Only Memory
RRC Radio Resource Control
RRH Remote Radio Head
RRM Radio Resource Management
RSRP Reference Signal Received Power
RSRQ Reference Signal Received Quality
RTT Round Trip Time
SA Stand-Alone
SCEF Service Capability Exposure Function
SCell Secondary Cell
SCG Secondary Cell Group
SIB System Information Block
SON Self-Organizing Network
SRB Signaling Radio Bearer
TS Technical Specification
UE User Equipment Those skilled in the art will recognize improvements and modifications to the embodiments of the present disclosure. All such improvements and modifications are considered within the scope of the concepts disclosed herein.

What is claimed is:

1. A method performed by a wireless device with respect to a cellular communications system, the method comprising:
   receiving configuration information indicating a time value;
   receiving a first message indicating that the wireless device is to resume a connection with a target cell of the cellular communications system and is to report early measurements with a second message to be transmitted by the wireless device to indicate that resumption of the connection with the target cell is complete; and
   transmitting the second message to indicate that the resumption of the connection with the target cell is complete and transmitting with the second message, as the early measurements, stored dormant mode measurements made by the wireless device that are not older than a time indicated by the time value.

2. The method of claim 1, wherein receiving the first message comprises receiving the first message from a network node of the cellular communications system that is associated with the target cell.

3. The method of claim 2, wherein the first message is an RRCResume message.

4. The method of claim 1, wherein transmitting the early measurements comprises including the early measurements in the second message.

5. The method of claim 4, wherein the second message is an RRCResumeComplete message.

6. The method of claim 1, wherein the first message is an RRCResume message, and the second message is an RRCResumeComplete message.

7. The method of claim 1, further comprising transmitting a request to resume the connection with the target cell and receiving the first message responsive to the request, and wherein the request indicates availability of stored dormant mode measurements.

8. The method of claim 1 further comprising, prior to receiving the first message, identifying that the target cell supports reporting of early measurements.

9. The method of claim 8, wherein identifying that the target cell supports reporting of early measurements comprises receiving a list of cells when being suspended or released, where each cell in the list of cells supports reporting of early measurements and the target cell is included in the list of cells.

10. The method of claim 1, wherein receiving the configuration information comprises receiving the configuration information from a network node of the cellular communications system that is associated with the target cell.

11. The method of claim 10, wherein receiving the configuration information comprises receiving a release message from the network node, releasing the wireless device to the dormant mode and indicating the time value.

12. A wireless device comprising to:
   a transceiver configured for wirelessly communicating with a cellular communications system; and
   processing circuitry configured to use the transceiver to:
      receive configuration information indicating a time value;
      receive a first message indicating that the wireless device is to resume a connection with a target cell of the cellular communications system and is to report early measurements with a second message to be transmitted by the wireless device to indicate that resumption of the connection with the target cell is complete; and transmit the second message to indicate that the resumption of the connection with the target cell is complete and transmit with the second message, as the early measurements, stored dormant mode measurements made by the wireless device that are not older than a time indicated by the time value.

13. The wireless device of claim 12, wherein the one or more processors are configured to, prior to receiving the indication, transmit a request to resume the connection with the target cell, wherein the request indicates availability of stored dormant mode measurements, and wherein the first message is received in response to the request.

14. A method performed by a base station of a cellular communications system, the method comprising:
   transmitting configuration information to a wireless device, indicating a time value;
   transmitting a first message to the wireless device, indicating that the wireless device is to resume a connection with a target cell associated with the base station and is to report early measurements with a second message to be transmitted by the wireless device to indicate that resumption of the connection with the target cell is complete; and
   receiving the second message with, as the early measurements, stored dormant mode measurements made by the wireless device that are not older than a time indicated by the time value.

15. The method of claim 14, wherein the first message is an RRCResume message.

16. The method of claim 14, wherein the early measurements are included in the second message.

17. The method of claim 16, wherein the second message is an RRCResumeComplete message.

18. The method of claim 14, wherein the first message is an RRCResume message, and the second message is an RRCResumeComplete message.

19. The method of claim 14, further comprising, prior to transmitting the first message, identifying that the wireless device has stored dormant mode measurements available for reporting.

20. The method of claim 19, wherein identifying that the wireless device has stored dormant mode measurements available for reporting comprises receiving, from the wireless device, a request to resume the connection with the target cell, the request comprising an indication that the wireless device has stored dormant mode measurements available for reporting.

21. The method of claim 19, wherein identifying that the wireless device has stored dormant mode measurements available for reporting comprises obtaining an Access Stratum (AS) Context of the wireless device indicating that the wireless device has stored dormant mode measurements available for reporting.

22. The method of claim 14, further comprising, prior to transmitting the first message, broadcasting or otherwise transmitting an indication that the target cell supports reporting of early measurements.

23. A base station configured for operation in a cellular communications system, the base station comprising:
   a transceiver configured for wirelessly communicating with a wireless device; and
   processing circuitry configured to use the transceiver to:
   transmit configuration information to the wireless device, indicating a time value;
   transmit a first message to the wireless device, indicating that the wireless device is to resume a connection with a target cell associated with the base station and is to report early measurements with a second message to be transmitted by the wireless device to indicate that resumption of the connection with the target cell is complete; and
   receive the second message from the wireless device with, as the early measurements, stored dormant mode measurements made by the wireless device that are not older than a time indicated by the time value.

\* \* \* \* \*